(12) United States Patent
Haga et al.

(10) Patent No.: US 11,818,024 B2
(45) Date of Patent: Nov. 14, 2023

(54) STATISTICAL INFORMATION GENERATION DEVICE, STATISTICAL INFORMATION GENERATION METHOD, AND RECORDING MEDIUM

(71) Applicant: Panasonic Intellectual Property Corporation of America, Torrance, CA (US)

(72) Inventors: Tomoyuki Haga, Nara (JP); Yuishi Torisaki, Osaka (JP); Manabu Maeda, Osaka (JP); Ryo Kato, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 304 days.

(21) Appl. No.: 17/240,098

(22) Filed: Apr. 26, 2021

(65) Prior Publication Data

US 2021/0266244 A1     Aug. 26, 2021

Related U.S. Application Data

(63) Continuation of application No. PCT/JP2019/046013, filed on Nov. 25, 2019.

(Continued)

(51) Int. Cl.
*H04L 43/0823* (2022.01)
*H04L 43/06* (2022.01)
(Continued)

(52) U.S. Cl.
CPC .......... *H04L 43/0823* (2013.01); *H04L 43/06* (2013.01); *H04L 67/12* (2013.01); *H04L 69/22* (2013.01)

(58) Field of Classification Search
None
See application file for complete search history.

(56) References Cited

U.S. PATENT DOCUMENTS

| 2007/0271374 A1 | 11/2007 | Shomura et al. |
| 2008/0201772 A1 * | 8/2008 | Mondaeev ............... H04L 47/12 726/13 |

(Continued)

FOREIGN PATENT DOCUMENTS

| CN | 101075911 | 11/2007 |
| CN | 103944915 | 7/2014 |

(Continued)

OTHER PUBLICATIONS

Subhojeet Mukherjee, Jacob Walker and Indrakshi Ray, A Precedence Graph-Based Approach to Detect Message Injection Attacks in J1939 Based Networks, pp. 67-76 (Year: 2017).*

(Continued)

*Primary Examiner* — Christopher M Crutchfield
(74) *Attorney, Agent, or Firm* — Wenderoth, Lind & Ponack, L.L.P.

(57) ABSTRACT

A statistical information generation device that generates statistical information from Ethernet frames on a mobility network includes: a transceiver that transmits and receives the Ethernet frames; and a statistical information generator that collects a plurality of Ethernet frames transmitted or received by the transceiver within a predetermined time period, and classifies, out of the plurality of Ethernet frames collected, Ethernet frames containing the same destination IP address, source IP address, destination port number, source port number, and protocol, and containing, in payloads, same identification information related to mobility control, into the same group, generates the statistical information for each group from the Ethernet frames classified (Continued)

(a) Standard format (b) Extended format into groups, and transmits the generated statistical information from the transceiver.

8 Claims, 20 Drawing Sheets

Related U.S. Application Data

(60) Provisional application No. 62/785,955, filed on Dec. 28, 2018.

(51) Int. Cl.
*H04L 67/12* (2022.01)
*H04L 69/22* (2022.01)

(56) References Cited

U.S. PATENT DOCUMENTS

| | | | | |
|---|---|---|---|---|
| 2015/0113638 | A1* | 4/2015 | Valasek | G06F 21/562 726/22 |
| 2015/0172298 | A1* | 6/2015 | Otsuka | H04L 63/123 726/30 |
| 2016/0308887 | A1* | 10/2016 | Jung | H04L 63/1416 |
| 2020/0216097 | A1* | 7/2020 | Galula | G06F 21/51 |

FOREIGN PATENT DOCUMENTS

| | | | |
|---|---|---|---|
| CN | 106209506 | | 12/2016 |
| CN | 110460621 A | * | 11/2019 |
| EP | 3 113 529 | | 1/2017 |
| JP | 2012-6446 | | 1/2012 |
| JP | 2017126978 A | * | 7/2017 ............. G06F 21/85 |

OTHER PUBLICATIONS

Author Unknown, Specification of Module SOME/IP Transport Protocol, pp. 1-56 (Year: 2016).*
Extended European Search Report dated Jan. 31, 2022 in corresponding European Patent Application No. 19904182.3.
Office Action and search report dated Aug. 30, 2022 in counterpart Chinese Patent Application No. 201980066059.1, with English-language translation of the search report.
International Search Report (ISR) dated Feb. 4, 2020 in International (PCT) Application No. PCT/JP2019/046013.
B. Claise, et al., "Specification of the IP Flow Information Export (IPFIX) Protocol for the Exchange of Flow Information", Internet Engineering Task Force (IETF), RFC7011, Sep. 2013.
Office Action and Search Report dated Mar. 29, 2023 in corresponding Chinese Patent Application No. 201980066059.1, with English translation of Search Report.

* cited by examiner

| Condition # | Details |
|---|---|
| Condition 1 | Anomaly in TCU communications |
| Condition 2 | Anomaly in communications from diagnostic port |
| Condition 3 | Anomaly in communications from IVI |
| Condition 4 | Communications with IP address not present inside vehicle |
| Condition 5 | Communications with MAC address not present inside vehicle |

FIG. 12

| Probe ID | Flow ID | Source IP address | Destination IP address | Source MAC address | Destination MAC address | Source port number | Destination port number | Protocol | Transmission rate | Session duration |
|---|---|---|---|---|---|---|---|---|---|---|
| 456 | 001 | 192.168.0.10 | 192.168.0.20 | AA:BB:CC:DD:EE:FF | AB:AB:AB:CD:CD:CD | 10 | 20 | TCP | 1.1Mbps | 5 sec |
| 456 | 002 | 192.168.0.10 | 192.168.0.20 | AA:BB:CC:DD:EE:FF | AB:AB:AB:CD:CD:CD | 30 | 40 | TCP | 3Mbps | 5 sec |
| 456 | 003 | 192.168.0.20 | 192.168.0.10 | AA:BB:AB:CD:CD:CD | AA:BB:CC:DD:EE:FF | 50 | 60 | TCP | 1.5Mbps | 5 sec |

~900

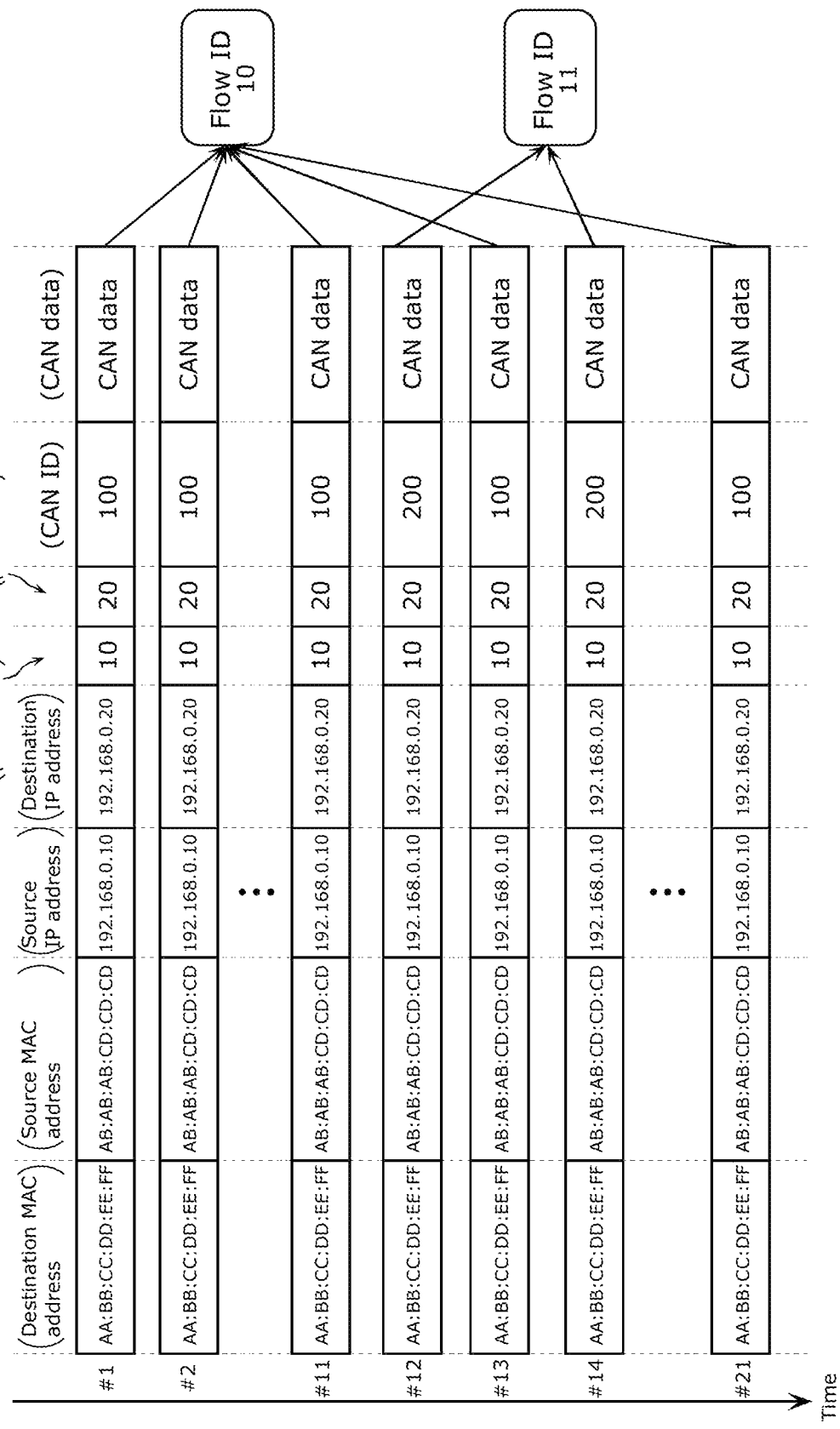

| Probe ID | Flow ID | Source IP address | Destination IP address | Source MAC address | Destination MAC address | Source port number | Destination port number | Protocol | CAN ID | Transmission rate | Session duration |
|---|---|---|---|---|---|---|---|---|---|---|---|
| 123 | 10 | 192.168.0.10 | 192.168.0.20 | AA:BB:CC:DD:EE:FF | AB:AB:AB:CD:CD:CD | 10 | 20 | TCP | 100 | 1Mbps | 5 sec |
| 123 | 11 | 192.168.0.10 | 192.168.0.20 | AA:BB:CC:DD:EE:FF | AB:AB:AB:CD:CD:CD | 10 | 20 | TCP | 200 | 0.1Mbps | 1 sec |
| 123 | 12 | 192.168.0.10 | 192.168.0.20 | AA:BB:CC:DD:EE:FF | AB:AB:AB:CD:CD:CD | 30 | 40 | TCP | 200 | 3Mbps | 5 sec |
| 456 | 40 | 192.168.0.20 | 192.168.0.10 | AB:AB:AB:CD:CD:CD | AA:BB:CC:DD:EE:FF | 50 | 60 | TCP | 300 | 0.5Mbps | 5 sec |
| 456 | 41 | 192.168.0.20 | 192.168.0.10 | AB:AB:AB:CD:CD:CD | AA:BB:CC:DD:EE:FF | 50 | 60 | TCP | 250 | 0.5Mbps | 5 sec |
| 789 | 70 | 192.168.0.10 | 192.168.0.20 | AA:BB:CC:DD:EE:FF | AB:AB:AB:CD:CD:CD | 10 | 20 | TCP | 100 | 1Mbps | 5 sec |
| 789 | 71 | 192.168.0.10 | 192.168.0.20 | AA:BB:CC:DD:EE:FF | AB:AB:AB:CD:CD:CD | 10 | 20 | TCP | 200 | 0.1Mbps | 1 sec |
| 789 | 72 | 192.168.0.10 | 192.168.0.20 | AA:BB:CC:DD:EE:FF | AB:AB:AB:CD:CD:CD | 30 | 40 | TCP | 200 | 3Mbps | 5 sec |
| 789 | 73 | 192.168.0.20 | 192.168.0.10 | AB:AB:AB:CD:CD:CD | AA:BB:CC:DD:EE:FF | 50 | 60 | TCP | 300 | 0.5Mbps | 5 sec |
| 789 | 74 | 192.168.0.20 | 192.168.0.10 | AB:AB:AB:CD:CD:CD | AA:BB:CC:DD:EE:FF | 50 | 60 | TCP | 250 | 0.5Mbps | 5 sec |
| 789 | 75 | 192.168.0.10 | 192.168.0.20 | AA:BB:CC:DD:EE:FF | AB:AB:AB:CD:CD:CD | 50 | 60 | TCP | 110 | 0.1Mbps | 5 sec |

| Rule ID | Probe ID | Source IP address | Destination IP address | Source MAC address | Destination MAC address | Source port number | Destination port number | CAN ID | Transmission rate | Session duration | Upper limit of number of simultaneously connected sessions |
|---|---|---|---|---|---|---|---|---|---|---|---|
| 001 | 123,789 | 192.168.0.10 | 192.168.0.20 | AA:BB:CC:DD:EE:FF | AB:AB:AB:CD:CD:CD | 10 | 20 | 100 | 0.8~1.2Mbps | 1 sec or more | – |
| 002 | 123,789 | 192.168.0.10 | 192.168.0.20 | AA:BB:CC:DD:EE:FF | AB:AB:AB:CD:CD:CD | 30 | 40 | 200 | 2.5~3.5Mbps | 5 sec or more | – |
| 003 | 456,789 | 192.168.0.20 | 192.168.0.10 | AB:AB:AB:CD:CD:CD | AA:BB:CC:DD:EE:FF | 50 | 60 | 300 | 0.3~0.7Mbps | 5 sec or more | – |
| 004 | 456,789 | 192.168.0.20 | 192.168.0.10 | AB:AB:AB:CD:CD:CD | AA:BB:CC:DD:EE:FF | 50 | 60 | 250 | 0.3~0.7Mbps | 5 sec | – |
| 005 | ALL | 192.168.0.10 | – | – | – | – | – | – | – | – | 2 |
| 006 | ALL | – | 192.168.0.10 | – | – | – | – | – | – | – | 3 |
| 007 | ALL | 192.168.0.20 | – | – | – | – | – | – | – | – | 2 |
| 008 | ALL | – | 192.168.0.20 | – | – | – | – | – | – | – | 3 |

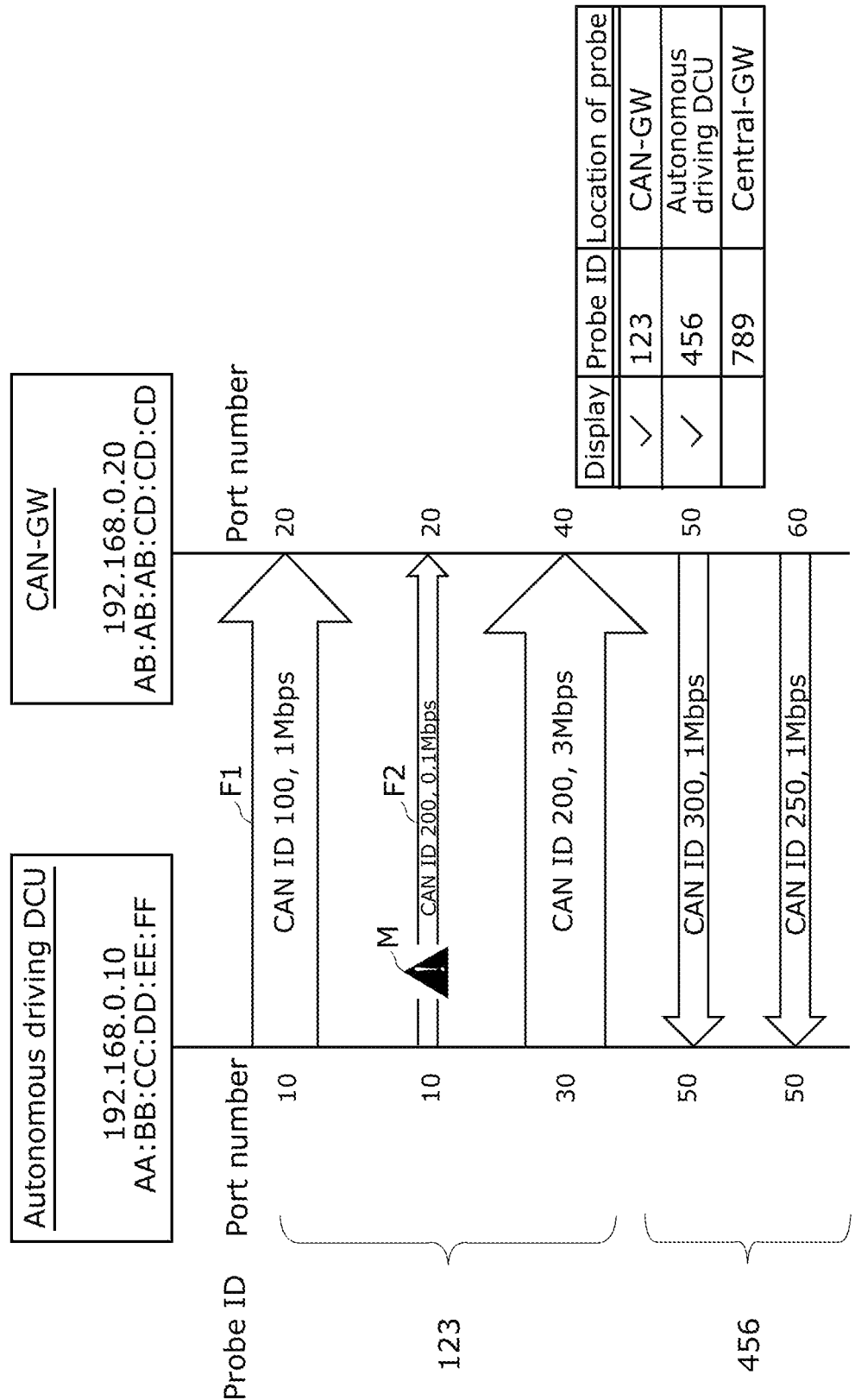

STATISTICAL INFORMATION GENERATION DEVICE, STATISTICAL INFORMATION GENERATION METHOD, AND RECORDING MEDIUM

CROSS REFERENCE TO RELATED APPLICATIONS

This is a continuation application of PCT International Application No. PCT/JP2019/046013 filed on Nov. 25, 2019, designating the United States of America, which is based on and claims priority of U.S. Provisional Patent Application No. 62/785,955 filed on Dec. 28, 2018. The entire disclosures of the above-identified applications, including the specifications, drawings and claims are incorporated herein by reference in their entirety.

FIELD

The present disclosure relates to a statistical information generation device, a statistical information generation method, and a recording medium.

BACKGROUND

In recent years, there has been an on-board network architecture using a CAN and Ethernet (a registered trademark) (see e.g., Patent Literature (PTL) 1) in combination.

CITATION LIST

Patent Literature

PTL 1: Japanese Unexamined Patent Application Publication No. 2012-6446

Non Patent Literature

NPL 1: Specification of the IP Flow Information Export (IPFIX) Protocol for the Exchange of Flow information (RFC7011)

SUMMARY

Technical Problem

However, the overall traffic on the on-board network cannot be grasped. It is also difficult to grasp the details of anomalies occurring in the on-board network. These problems may occur not only in on-board networks but widely in mobility networks.

To address the problems, the present disclosure provides a statistical information generation device, for example, that properly analyzes an anomaly in the mobility network.

Solution to Problem

A statistical information generation device according to an aspect of the present disclosure generates statistical information from Ethernet (registered trademark) frames on a mobility network. The statistical information generation device includes: a transceiver that transmits and receives the Ethernet frames; and a statistical information generator that: (a) collects a plurality of Ethernet frames transmitted or received by the transceiver within a predetermined time period, and classifies, out of the plurality of Ethernet frames collected, Ethernet frames containing same destination IP address, source IP address, destination port number, source port number, and protocol, and containing, in payloads, same identification information related to mobility control, into a same group; (b) generates the statistical information for each group from the Ethernet frames classified into groups; and (c) transmits, from the transceiver, the statistical information generated.

This general and specific aspect may be implemented using a system, a method, an integrated circuit, a computer program, or a computer-readable recording medium such as a CD-ROM, or any combination of systems, methods, integrated circuits, computer programs, or recording media.

Advantageous Effects

The statistical information generation device according to the present disclosure properly analyzes an anomaly in a mobility network.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 8 shows conditions of switching an operation mode according to the embodiment.

FIG. 12 is an illustration showing an example of the statistical information generated by a statistical information generator according to the embodiment in a normal mode.

FIG. 13 shows an example of classification of flows where the data field of Ethernet frames according to the embodiment stores a CAN message.

FIG. 14 is an illustration showing an example of the statistical information generated by the statistical information generator in an extended mode and collected by a statistical information collector in the embodiment.

FIG. 15 is an illustration showing an example of a rule table containing an anomaly detection rule according to the embodiment.

FIG. 16 is an illustration showing a first example of a monitoring screen of a server according to the embodiment using the statistical information.

Figure 1:
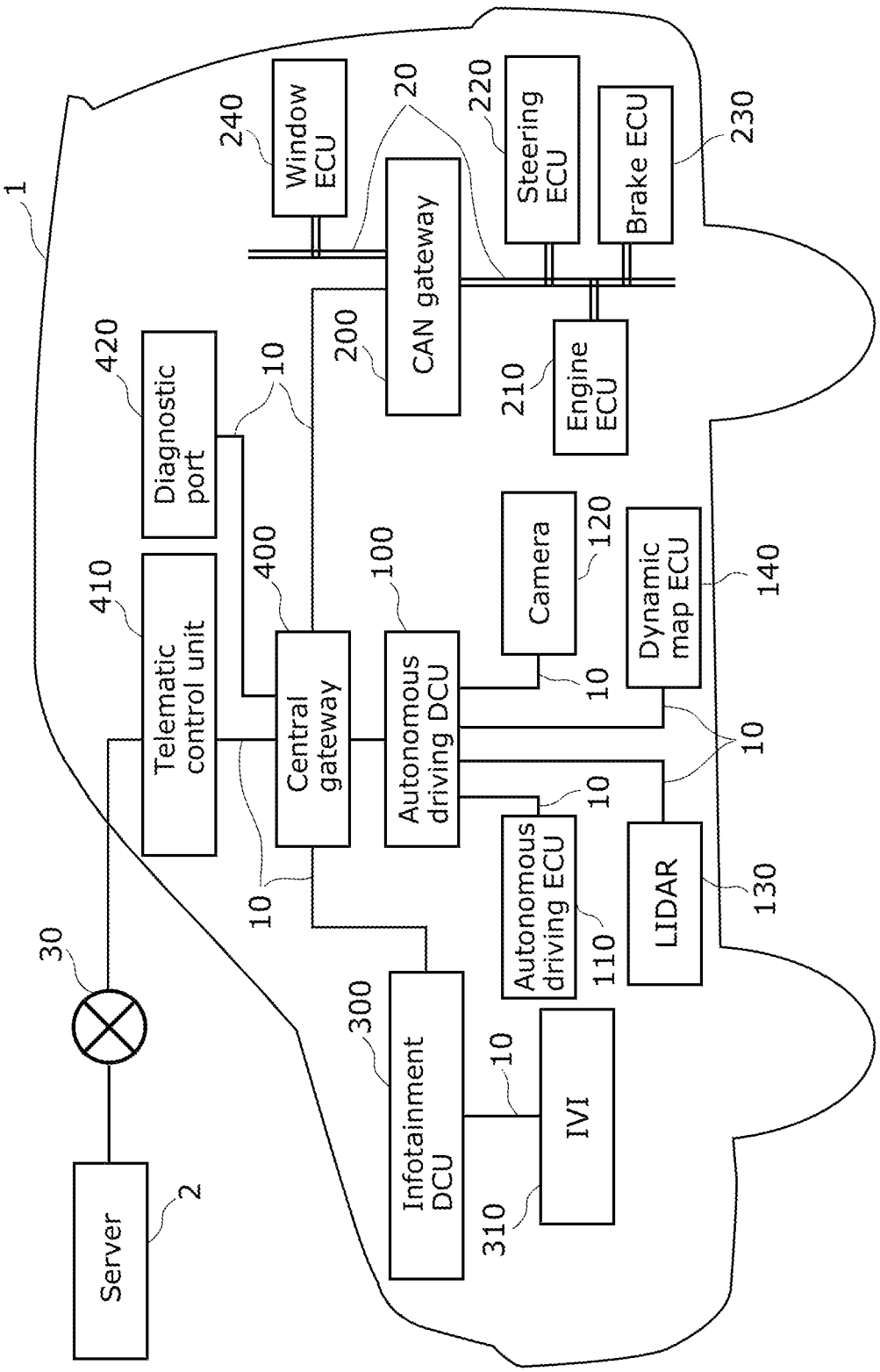
FIG. 1 is an overall configuration diagram of an on-board network according to an embodiment.

DESCRIPTION OF EMBODIMENT (Underlying Knowledge Forming Basis of the Present Disclosure)

The present inventors found that the on-board network architecture described in the "background art" poses the following problem.

In recent years, a large number of devices called "electronic control units (ECUs)" are arranged in vehicle systems. Networks connecting these ECUs are called "on-board networks".

There are a large number of protocols for on-board networks. As one of most principal ones of the on-board networks, there is a protocol called a "controller area network (CAN)" under ISO 11898-1. On the other hand, there is a protocol called "Ethernet (registered trademark)" under IEEE 802.3 to transfer a larger amount of information.

In advanced driver-assistance systems (ADAS) or autonomous driving, there is a need to process data obtained by sensors such as cameras or light detection and ranging (LIDAR) devices or a huge amount of information related to dynamic maps. Accordingly, an increasing number of on-board networks employ the Ethernet capable of high-speed data transmission. On the other hand, typically employed CANs are continuously used as vehicle control systems. Accordingly, an increasing number of on-board network architectures use a CAN and Ethernet in combination.

With a progress of electronic control, an automobile connected to an external network may be subjected to fraud control by faking commands of an automobile control system.

There is a protocol called "IPFIX" as a method of monitoring the overall traffic on an IT network (see NPL 1). Under IPFIX, communication packets (or communication frames) with the same source IP address, destination IP address, source port number, destination port number, and the protocol (i.e., 5-tuples) are classified as the same group. By a known method, statistical information called "flow information" is generated from communication packets belonging to the group, the generated flow information is transmitted to terminals called "collectors" and the traffic on the network is monitored on the collectors. Note that the communication packets will be simply referred to as "packets" and the "communication frames" as "frames".

Through the classification with five tuples, however, detailed analysis of the traffic is difficult. In an on-board network, Ethernet frames may contain the same five tuples in the payloads but store different CAN messages for controlling a vehicle. In this case, the traffic cannot be monitored for each type of the CAN messages contained, in the payloads of the Ethernet frames, for controlling the vehicle. Even if an anomaly can be detected, grasping the details of the anomaly (i.e., what kind of anomaly occurs) is particularly difficult.

In PTL 1, in order to identify the point in the vehicle network where the anomaly has been detected, the information on the sources of the messages received by a gateway is transmitted to an external diagnostic device. The anomaly detection is performed not using the statistical information generated in accordance with the messages of the sources. Accordingly, the overall traffic on the on-board network cannot be grasped, and grasping what kind of anomaly occurs, in other words, the details of the anomaly is difficult.

To address the problems, the present disclosure provides a statistical information generation device, for example, that properly analyzes an anomaly in a mobility network.

In order to solve the problems, a statistical information generation device according to an aspect of the present disclosure generates statistical information from Ethernet (registered trademark) frames on a mobility network. The statistical information generation device comprising: a transceiver that transmits and receives the Ethernet frames; and a statistical information generator that: (a) collects a plurality of Ethernet frames transmitted or received by the transceiver within a predetermined time period, and classifies, out of the plurality of Ethernet frames collected, Ethernet frames containing same destination IP address, source IP address, destination port number, source port number, and protocol, and containing, in payloads, same identification information related to mobility control, into a same group; (b) generates the statistical information for each group from the Ethernet frames classified into groups; and (c) transmits, from the transceiver, the statistical information generated.

According to the aspect, the statistical information generation device generates the statistical information from the Ethernet frames as units, taking the identification information related to the mobility control in addition to the 5-tuple information (i.e., the destination IP address, the source IP address, the destination port number, the source port number, and the protocol) into consideration. This configuration allows generation of the statistical information in more detailed units than the case of generating the statistical information taking only the 5-tuple information into consideration. Using the statistical information generated in this manner allows more detailed analysis and more accurate detection of an anomaly than using the statistical information generated taking only the 5-tuple information into consideration. Accordingly, the statistical information generation device properly analyzes an anomaly in the mobility network.

For example, the statistical information generator may generate the statistical information in an operation mode that is one of a first mode and a second mode. In the first mode, the statistical information generator may: (d) collect the plurality of Ethernet frames transmitted or received by the transceiver within the predetermined time period, and classifies, out of the plurality of Ethernet frames collected, Ethernet frames containing same destination IP address, source IP address, destination port number, source port number, and protocol, into a same group; (e) generate the statistical information for each group from the Ethernet frames classified into groups; and (f) transmit, from the transceiver, the statistical information generated. In the second mode, the statistical information generator may perform (a), (b), and (c).

According to the aspect, the statistical information generation device generates the statistical information on the flow of the mobility network taking the 5-tuple information into consideration at a certain time. The device generates the statistical information taking the 5-tuple information and the identification information related to the mobility control into consideration at another time. In this manner, the statistical information generation device generates typical (i.e., normal) statistical information and performs the analysis based on the generated statistical information. As necessary, the device generates detailed statistical information and performs accurate analysis based on the generated statistical information. In this manner, the statistical information generation device analyzes an anomaly in the mobility network further more properly.

For example, the statistical information generator may: make a determination on whether a predetermined condition is satisfied; and change the operation mode from one of the first mode and the second mode to the other, when determining that the predetermined condition is satisfied.

According to the aspect, at a satisfaction of the predetermined condition, the statistical information generation device changes its operation mode to generate detailed statistical information and perform accurate analysis based on the generated statistical information. With the use of the condition representing the situation requiring an accurate analysis as the predetermined condition, the statistical information generation device changes its operation mode to perform accurate analysis when necessary. In this manner, the statistical information generation device analyzes an anomaly in the mobility network further more properly.

For example, the statistical information generator may make the determination with reception of an Ethernet frame by the transceiver regarded as the predetermined condition, the Ethernet frame containing an instruction for switching the operation mode.

According to the aspect, receiving a switch instruction, the statistical information generation device changes its operation mode in accordance with the switch instruction. Since the switch instruction can be transmitted by an ECU or an external server, the statistical information generation device analyzes an anomaly in accordance with the switch instruction from the ECU or the external server, for example. In this manner, the statistical information generation device allows more proper analysis of an anomaly in the mobility network.

For example, the statistical information generator may: make the determination with detection of an occurrence of an anomaly in the mobility network regarded as the predetermined condition; and change from the first mode to the second mode at a satisfaction of the predetermined condition.

According to the aspect, the statistical information generation device changes its operation mode to preform accurate analysis based on the detection of an anomaly that may occur inside the mobility network. In this manner, the statistical information generation device allows more proper analysis of an anomaly in the mobility network.

For example, the statistical information generator may further generate the statistical information in the second mode from one of the Ethernet frames containing a predetermined IP address as the source IP address or the destination IP address, when determining that the transceiver has received the one of the Ethernet frames.

According to the aspect, the statistical information generation device accurately analyzes the Ethernet frame containing the specific IP address as the destination or the source. For example, the device generates the statistical information, including the payload, from the Ethernet frame containing the specific IP address to be analyzed in detail. Accordingly, whether a fraud vehicle control instruction flows or whether the vehicle is attacked can be monitored. In this manner, the statistical information generation device allows more proper and flexible analysis of an anomaly in the mobility network.

For example, the statistical information generator may further generate the statistical information in the second mode from one of the Ethernet frames related to a mobility control instruction, when determining that the transceiver has received the one of the Ethernet frames.

According to the aspect, the statistical information generation device accurately analyzes the Ethernet frames related to a specific mobility control instruction. For example, the device generates the statistical information, including the payload, from the Ethernet frames transmitted from or to the ECU that performs vehicle control such as travel, curve, or stop. Accordingly, whether a fraud vehicle control instruction flows can be monitored. In this manner, the statistical information generation device allows more proper and flexible analysis of an anomaly in the mobility network.

A statistical information generation method according to an aspect of the present disclosure is executed by a statistical information generation device that generates statistical information from Ethernet frames on a mobility network. The statistical information generation device includes: a transceiver that transmits and receives the Ethernet frames. The statistical information generation method includes: (a) collecting a plurality of Ethernet frames transmitted or received by the transceiver within a predetermined time period, and classifying, out of the plurality of Ethernet frames collected, Ethernet frames containing same destination IP address, source IP address, destination port number, source port number, and protocol, and containing, in payloads, same identification information related to mobility control, into a same group; (b) generating the statistical information for each group from the Ethernet frames classified into groups; and (c) transmitting the statistical information generated, using the transceiver.

The method provides the same or similar advantages as the statistical information generation device described above.

A recoding medium according to an aspect of the present disclosure is a non-transitory computer-readable recording medium having a program recorded therein for causing a computer to execute the statistical information generation method described above.

The program provides the same or similar advantages as the statistical information generation device described above.

These general and specific aspects may be implemented using a system, a method, an integrated circuit, a computer program, or a computer-readable recording medium such as a CD-ROM, or any combination of systems, methods, integrated circuits, computer programs, or recording media.

Now, an embodiment will be described in detail with reference to the drawings.

Note that the embodiment described below is a mere comprehensive or specific example. The numerical values, shapes, materials, constituent elements, the arrangement and connection of the constituent elements, steps, step orders etc. shown in the following embodiment are thus mere examples, and are not intended to limit the scope of the present disclosure. Among the constituent elements in the following embodiment, those not recited in any of the independent claims defining the broadest concept of the present disclosure are described as optional constituent elements.

Embodiment

A statistical information generation device will be described in this embodiment which properly analyzes an anomaly in a mobility network.

The statistical information generation device according to this embodiment generates statistical information from Ethernet frames on the mobility network, and includes a transceiver and a statistical information generator.

The transceiver transmits and receives the Ethernet frames.

The statistical information generator (a) collects a plurality of Ethernet frames transmitted or received by the transceiver within a predetermined time period, and classifies, out of the plurality of Ethernet frames collected, Ethernet frames containing same destination IP address, source IP address, destination port number, source port number, and protocol, and containing, in payloads, same identification information related to mobility control, into a same group. In addition, the statistical information generator (b) generates the statistical information for each group from the Ethernet frames classified into groups. The statistical information generator then (c) transmits, from the transceiver, the statistical information generated.

The statistical information generator may generate the statistical information in an operation mode that is one of a first mode and a second mode. Here, in the first mode, the statistical information generator (d) collects the plurality of Ethernet frames transmitted or received by the transceiver within the predetermined time period, and classifies, out of the plurality of Ethernet frames collected, Ethernet frames containing same destination IP address, source IP address, destination port number, source port number, and protocol, into a same group. In addition, the statistical information generator (e) generates the statistical information for each group from the Ethernet frames classified into groups. The statistical information generator then (f) transmits, from the transceiver, the statistical information generated. On the other hand, in the second mode, the statistical information generator performs (a), (b), and (c).

Note that the first mode corresponds to a normal mode in which flow information is generated in accordance with IPFIX. The flow is classified based on the details of the five tuples and the flow information is generated. On the other hand, the second mode corresponds to an extended mode in which the flow information is generated in accordance with the contents of the Ethernet payloads. In the second mode, the flow is classified based on the details of the five tuples and on the identification information contained in data so as to generate the flow information.

The statistical information generator may make a determination on whether a predetermined condition is satisfied, and change the operation mode from one of the first mode and the second mode to the other, when determining that the predetermined condition is satisfied.

The statistical information generator may make the determination with reception of an Ethernet frame, which contains an instruction for switching the operation mode, by the transceiver regarded as the predetermined condition.

The statistical information generator may make the determination with detection of an occurrence of an anomaly in the mobility network regarded as the predetermined condition, and change from the first mode to the second mode at a satisfaction of the predetermined condition.

The statistical information generator may further generate the statistical information in the second mode from one of the Ethernet frames containing a predetermined IP address as the source IP address or the destination IP address, when determining that the transceiver has received the one of the Ethernet frames.

The statistical information generator may further generate the statistical information in the second mode from one of the Ethernet frames related to a mobility control instruction, when determining that the transceiver has received the one of the Ethernet frames.

Now, the statistical information generation device in an on-board network that is the mobility network will be described in detail.

FIG. 1 is an overall configuration diagram of the on-board network according to this embodiment. The on-board network of vehicle 1 includes Ethernet 10 and CAN 20.

Vehicle 1 includes one or more ECUs and one or more domain control units (DCUs).

Specifically, vehicle 1 includes autonomous driving DCU 100, autonomous driving ECU 110, cameras 120, LIDAR devices 130, dynamic map ECU 140, CAN gateway 200, engine ECU 210, steering ECU 220, brake ECU 230, window ECU 240, infotainment DCU 300, IVI 310, central gateway 400, telematic control unit 410, and diagnostic port 420.

Each of autonomous driving DCU 100, CAN gateway 200, and central gateway 400 corresponds to the statistical information generation device.

Central gateway 400 is connected by Ethernet 10 to telematic control unit 410, diagnostic port 420, autonomous driving DCU 100, CAN gateway 200, and infotainment DCU 300.

Telematic control unit 410 allows communications of vehicle 1 with server 2 connected to external network 30, and includes an interface for communications via a mobile phone network or Wi-Fi (registered trademark) in this embodiment.

Diagnostic port 420 is used by a dealer for malfunction diagnosis of vehicle 1 and utilized for transmitting and receiving commands for the diagnosis.

Autonomous driving DCU 100 is connected by Ethernet 10 to autonomous driving ECU 110, cameras 120 that image the environment outside the vehicle, LIDAR devices 130 that sense obstacles outside the vehicle, and dynamic map ECU 140 that receives or controls dynamic maps.

CAN gateway 200 is connected to CAN 20 and Ethernet 10. In this embodiment, CAN gateway 200 is connected to two CAN buses, namely, a control system bus and a body system bus. The control system bus is connected to engine ECU 210, steering ECU 220, and brake ECU 230. The body system bus is connected to window ECU 240 that controls opening and closing windows.

Infotainment DCU 300 is connected to in-vehicle infotainment (IVI) 310 by Ethernet 10 and manages the domains of an information system network.

Figure 2:
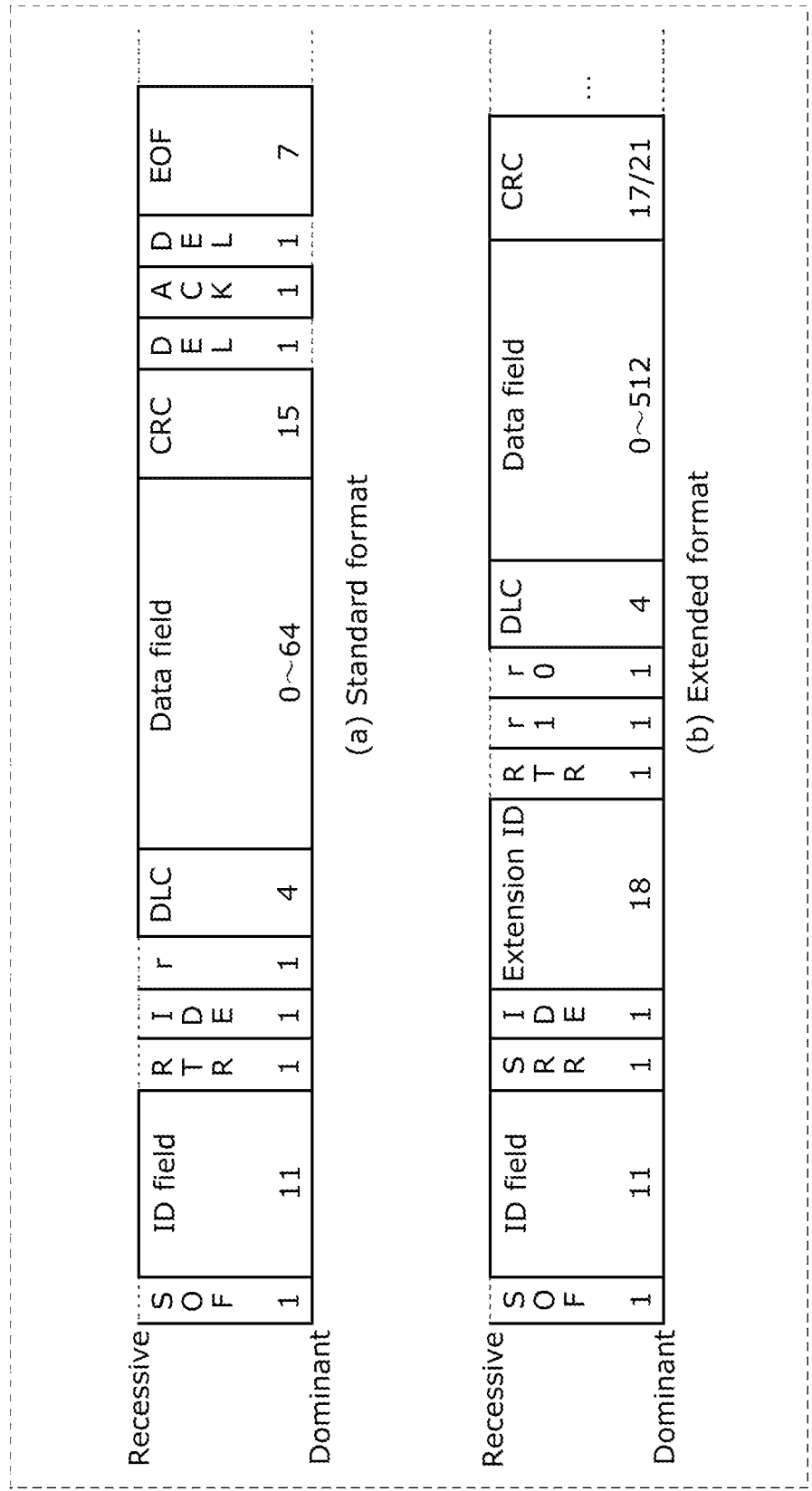
FIG. 2 is an illustration showing formats of a CAN frame according to the embodiment.

FIG. 2 is an illustration showing CAN frame formats according to this embodiment.

The CAN frame formats generally include a standard format shown as (a) in FIG. 2, and an extended format shown as (b) In FIG. 2. While this embodiment will be described where the CAN frame has the standard format, the CAN frame may have the extended format.

Figure 3:
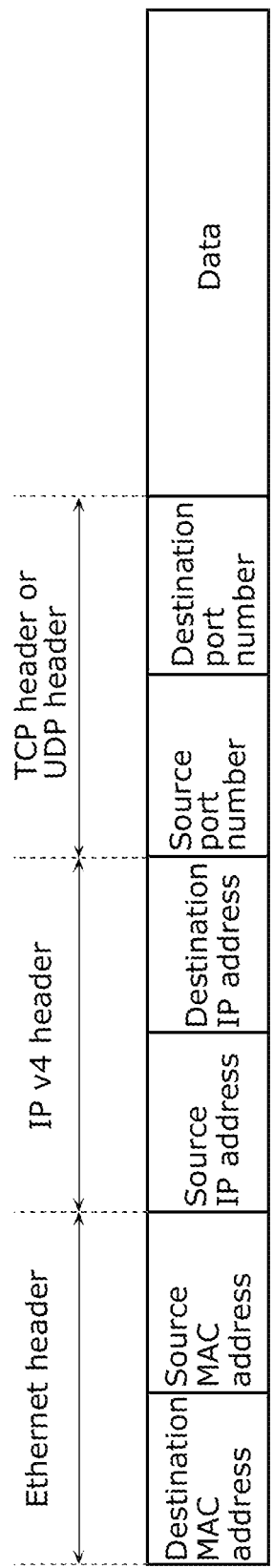
FIG. 3 is an illustration showing a frame format of each Ethernet frame according to the embodiment.

FIG. 3 is an illustration showing a frame format of each Ethernet frame according to this embodiment.

The Ethernet frame includes an Ethernet header, an IP header, a TCP header or an UDP header, and data.

The Ethernet header includes a destination MAC address and a source MAC address.

The IP header includes a source IP address and a destination address.

The TCP header or the UDP header includes a source port number and a destination port number.

The data, that is, the Ethernet payload (more specifically, a TCP payload or an UDP payload) stores the data transferred as the Ethernet frame. The data stores CAN frames at times of vehicle control, for example. The data may also store camera images or information from the LIDAR devices, sensors, or the dynamic maps, for example. A case will be described in this embodiment where the data includes the CAN frames.

Figure 4:
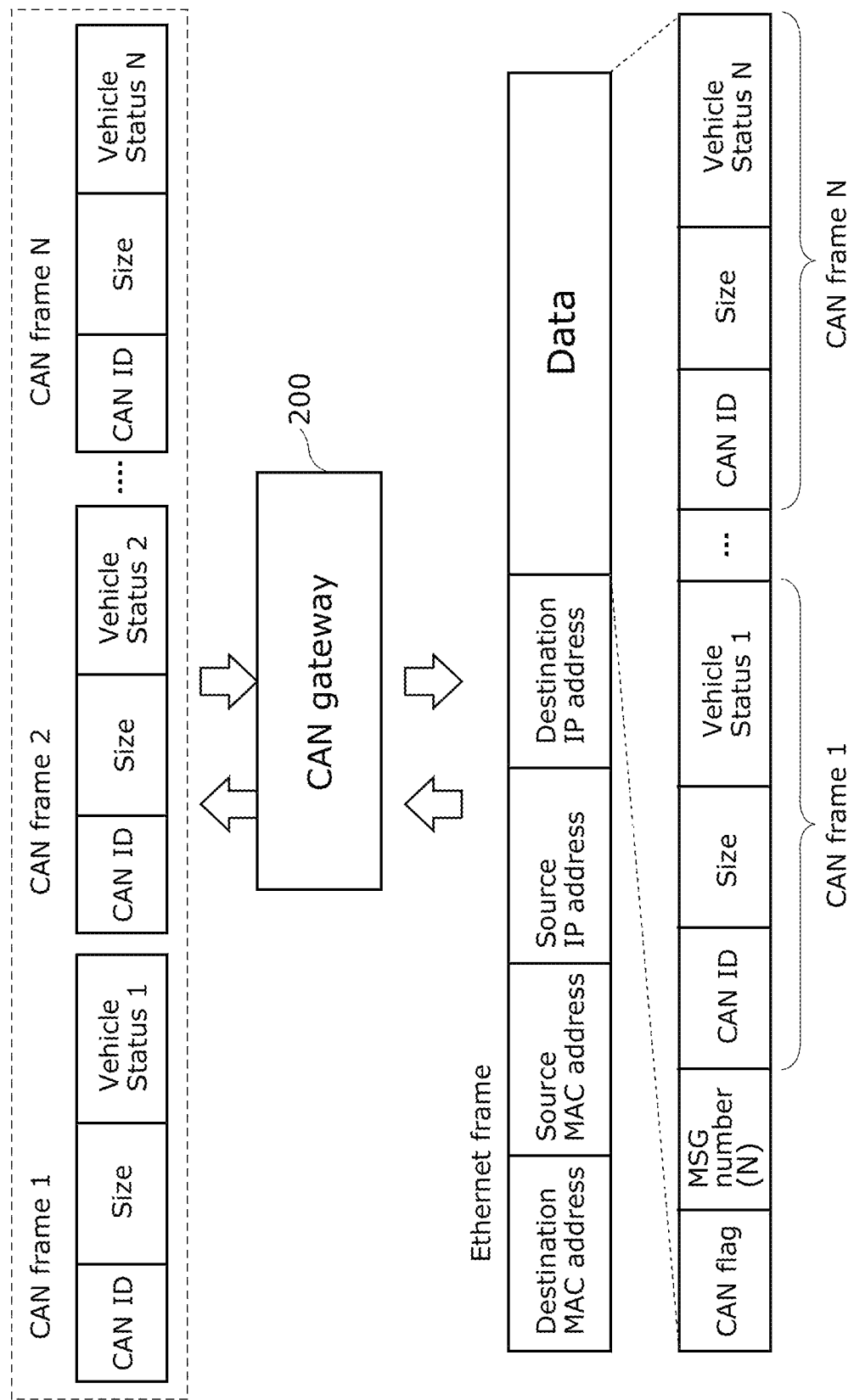
FIG. 4 is an illustration showing frame conversion processing by a CAN gateway according to the embodiment.

FIG. 4 is an illustration showing frame conversion processing by CAN gateway 200 according to this embodiment. Specifically, FIG. 4 shows the frames input to and output from CAN gateway 200.

Upon receipt of the CAN frames from CAN 20, CAN gateway 200 connects N CAN frames and sets the connected CAN frames as Ethernet frame data. CAN gateway 200 transmits the information on the CAN as the Ethernet frame via Ethernet transceiver 201 to a desired destination connected onto Ethernet. Note that N is a predetermined integer value.

Upon receipt of an Ethernet frame from Ethernet 10 as the opposite path, CAN gateway 200 determines where the Ethernet frame data stores CAN frames. If CAN frames are stored, CAN gateway 200 extracts the stored CAN frames and transmits the extracted CAN frames to the CAN buses.

Figure 5:
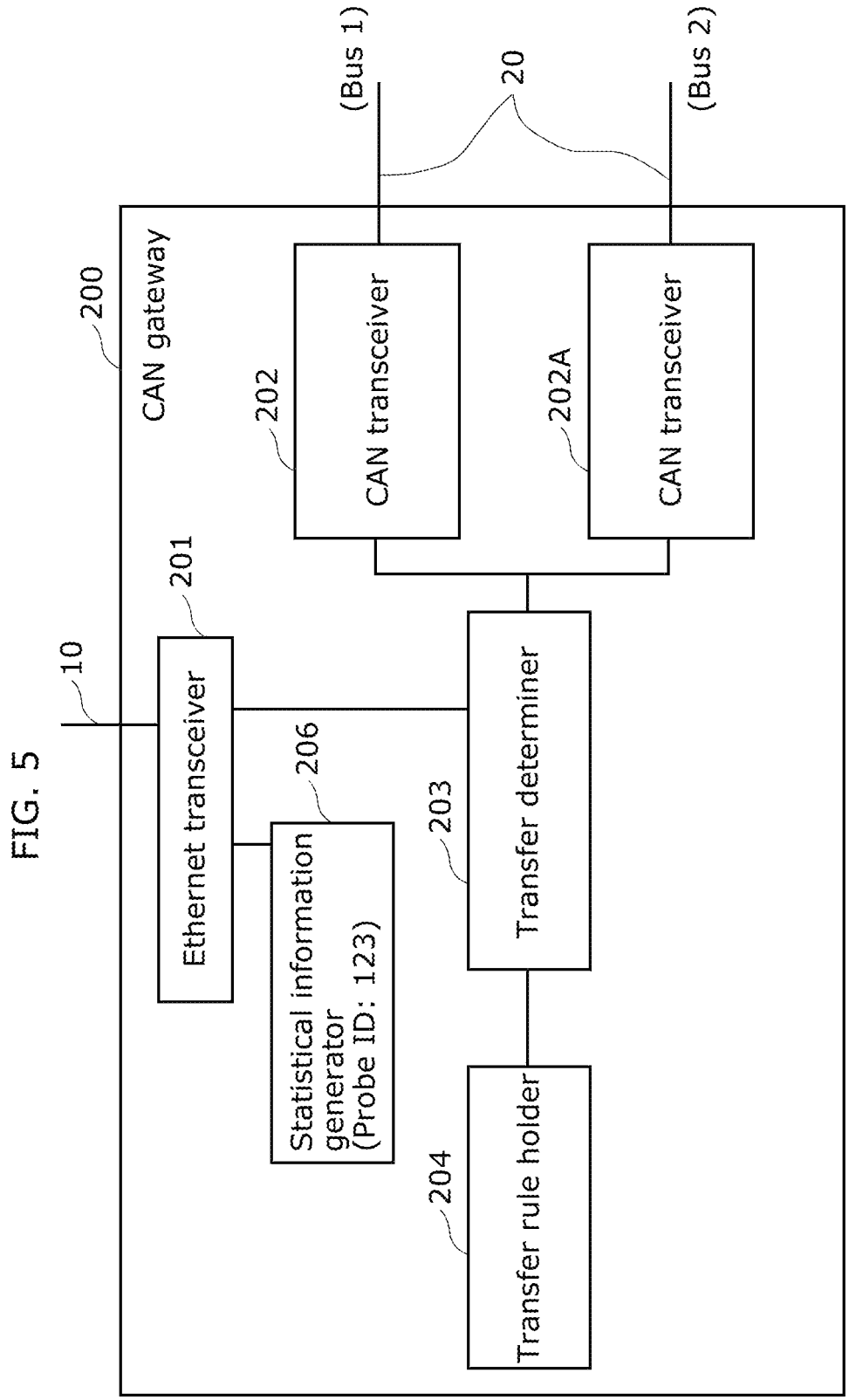
FIG. 5 is a block diagram showing a configuration of the CAN gateway according to the embodiment.

FIG. 5 is a block diagram showing a configuration of CAN gateway 200 according to this embodiment.

As shown in FIG. 5, CAN gateway 200 includes Ethernet transceiver 201, CAN transceivers 202 and 202A, transfer determiner 203, transfer rule holder 204, and statistical information generator 206.

Upon receipt of CAN frames from CAN transceiver 202 or 202A, CAN gateway 200 convers the received CAN message to an Ethernet frame and transfers the Ethernet frame to Ethernet 10 utilizing Ethernet transceiver 201.

Upon receipt of an Ethernet frame from Ethernet transceiver 201, CAN gateway 20 converts the received Ethernet frame to CAN frames and transfers the CAN frames to CAN 20 utilizing CAN transceiver 202 or 202A.

Ethernet transceiver 201 is a communication interface that transmits Ethernet frames to Ethernet 10 and receives Ethernet frames from Ethernet 10.

CAN transceiver 202 is a communication interface connected to bus 1 of CAN 20. CAN transceiver 202 transmits CAN frames through CAN 20 (bus 1) and receives CAN frames through CAN 20 (bus 1).

CAN transceiver 202A is a communication interface that has the same functions as CAN transceiver 202, and operates independently from CAN transceiver 202. CAN transceiver 202A is connected to bus 2 of CAN 20.

Transfer determiner 203 is a processor that determines whether frames can be transferred between Ethernet transceiver 201 and CAN transceiver 202 or 202A. Transfer determiner 203 determines whether frames can be transferred with reference to a transfer rule held by transfer rule holder 204 and controls Ethernet transceiver 201 and CAN transceiver 202 or 202A to or to not transfer (i.e., prohibit transferring) the frames.

Transfer rule holder 204 is a storage device that holds a rule showing whether frames can be transferred between Ethernet transceiver 201 and CAN transceiver 202 or 202A.

Statistical information generator 206 generates the statistical information from the Ethernet frames received by Ethernet transceiver 201. Statistical information generator 206 generates the statistical information in any of two operation modes of a normal mode and an extended mode. In the normal mode, flow information is generated in accordance with IPFIX. Unlike in the normal mode, in the extended mode, flow information is generated in accordance with the contents of the Ethernet payloads. Statistical information generator 206 transmits the generated statistical information to central gateway 400 via Ethernet transceiver 201.

Statistical information generator 206 receives mode switch instruction commands (simply referred to as "switch instructions") from Ethernet transceiver 201 and changes its mode.

Note that the statistical information generated by statistical information generator 206 includes a probe ID number that is identification information unique to statistical information generator 206. The statistical information is generated by statistical information generator 106 of autonomous driving DCU 100 or statistical information generator 406 of central gateway 400. In order to distinguish the statistical information generated by statistical information generator 206 from the statistical information generated by other statistical information generators, the probe ID number is assigned which indicates which statistical information generator has generated the information. An example will be described in this embodiment where the probe ID number of CAN gateway 200, that is, statistical information generator 206 is "123".

Figure 6:
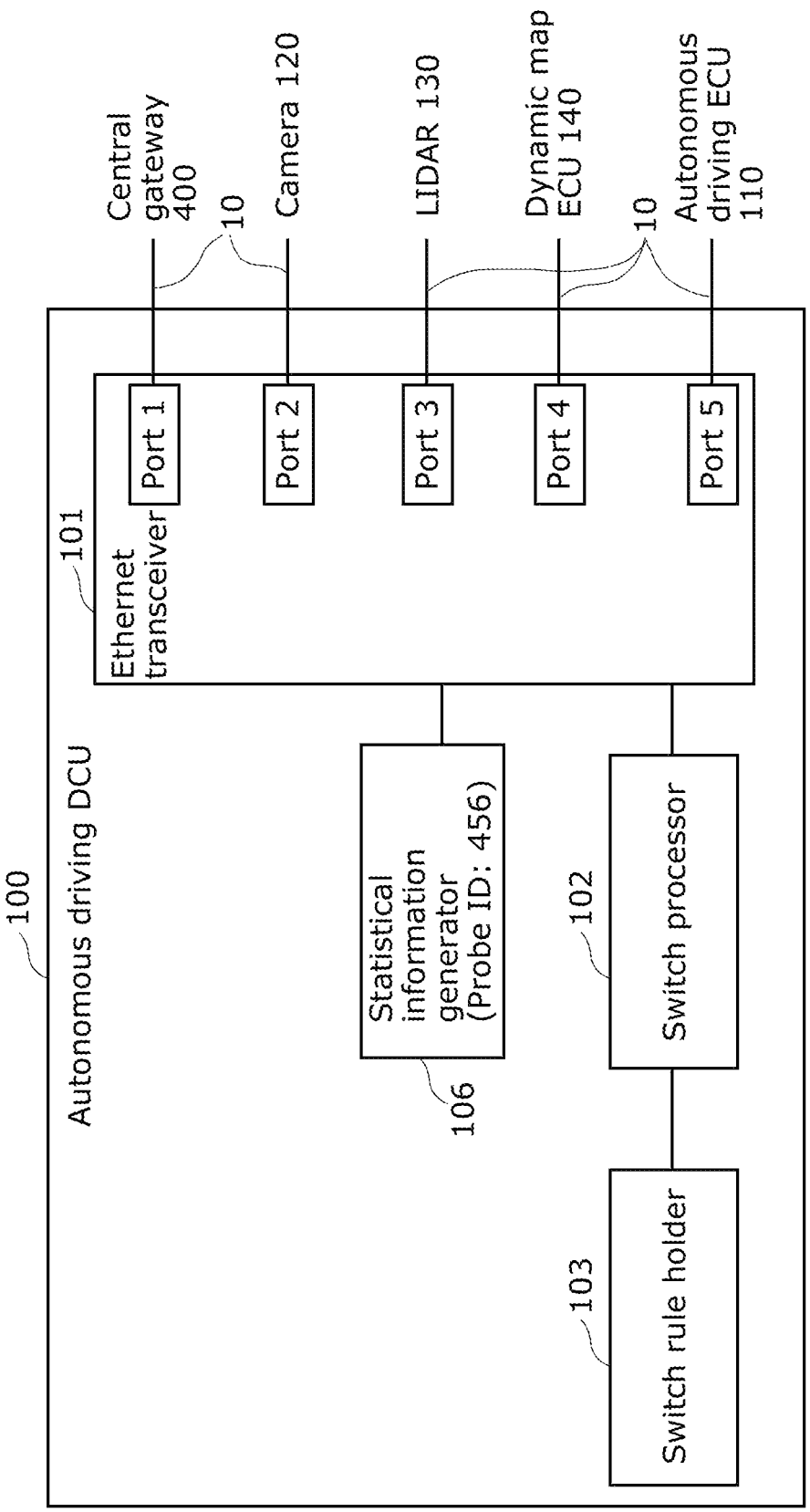
FIG. 6 is a block diagram showing a configuration of an autonomous driving DCU according to the embodiment.

FIG. 6 is a block diagram showing a configuration of autonomous driving DCU 100 according to this embodiment.

As shown in FIG. 6, autonomous driving DCU 100 includes Ethernet transceiver 101, switch processor 102, switch rule holder 103, and statistical information generator 106.

Ethernet transceiver 101 includes, in this embodiment, five Ethernet ports, each connected to one of autonomous driving ECU 110, cameras 120, LIDAR devices 130, dynamic map ECU 140, and central gateway 400 by Ethernet 10. Note that the number of ports is not limited to five.

Switch processor 102 performs the processing of transferring the Ethernet frames received by Ethernet transceiver 101 to proper transfer destinations based on the rule (also referred to as a "switch rule) held by switch rule holder 103.

Switch rule holder 103 is a storage device that holds the switch rule used by switch processor 102 for transferring the Ethernet frames.

Statistical information generator 106 generates the statistical information from the Ethernet frames received by Ethernet transceiver 101. Statistical information generator 106 generates the statistical information in any of two operation modes of the normal mode and the extended mode. In the normal mode, the flow information is generated in accordance with IPFIX. Unlike in the normal mode, in the extended mode, the flow information is generated in accordance with the contents of the Ethernet payloads. Statistical information generator 106 transmits the generated statistical information to central gateway 400.

Statistical information generator 106 receives the mode switch instruction commands, that is, switch instructions from Ethernet transceiver 101 and changes its mode.

Note that the statistical information generated by statistical information generator 106 is, for the same reasons described in statistical information generator 206 of CAN gateway 200, assigned with the probe ID number indicating which statistical information generator has generated the information. An example will be described in this embodiment where the probe ID number of autonomous driving DCU 100, that is, statistical information generator 106 is "456".

Figure 7:
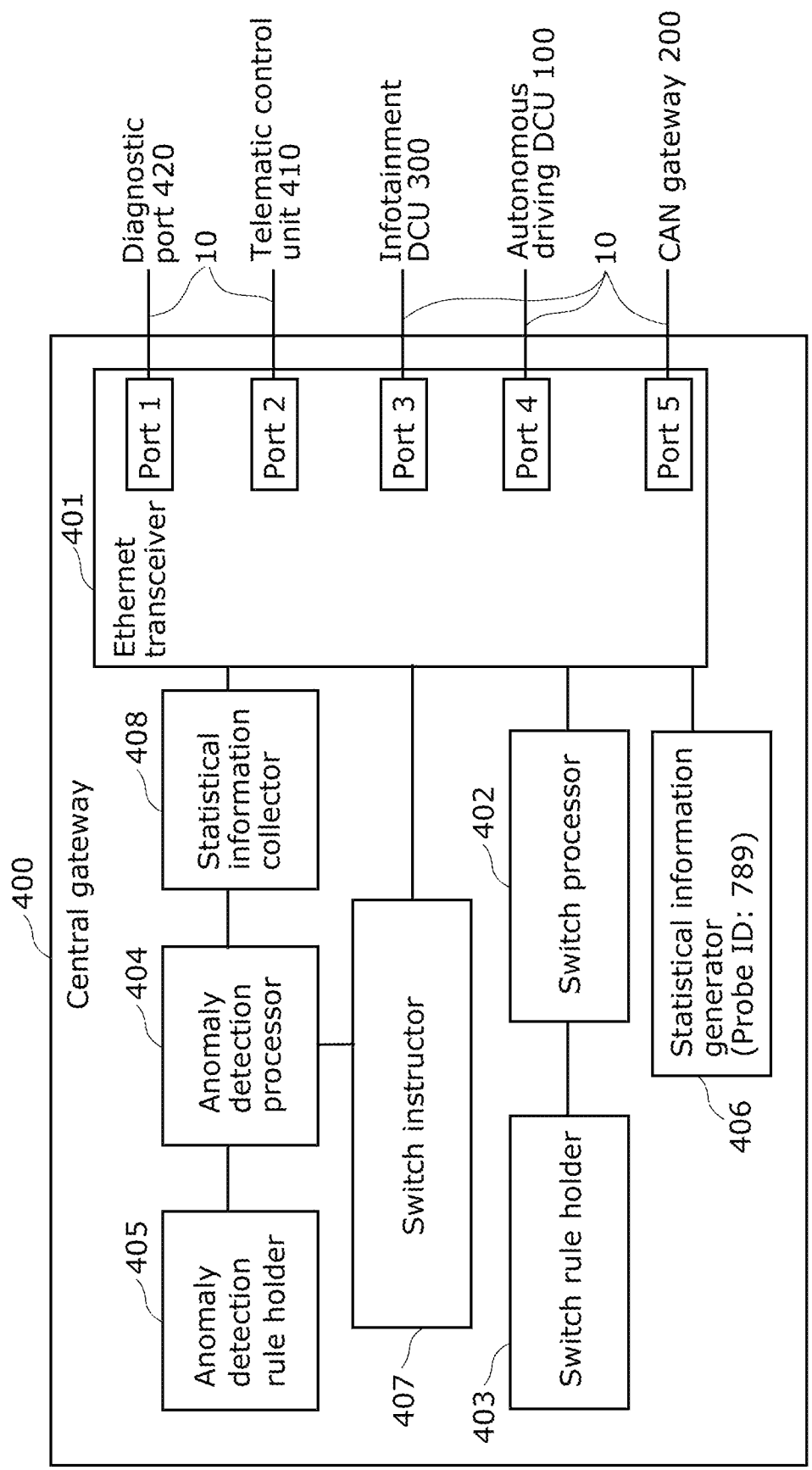
FIG. 7 is a block diagram showing a configuration of a central gateway according to the embodiment.

FIG. 7 is a block diagram showing a configuration of central gateway 400 according to this embodiment.

As shown in FIG. 7, central gateway 400 includes Ethernet transceiver 401, switch processor 402, switch rule holder 403, anomaly detection processor 404, anomaly detection rule holder 405, statistical information generator 406, and switch instructor 407.

Ethernet transceiver 401 includes, in this embodiment, five Ethernet ports, each connected to one of diagnostic port 420, telematic control unit 410, infotainment DCU 300, autonomous driving DCU 100, and CAN gateway 200 by Ethernet 10. Note that the number of ports is not limited to five.

Switch processor 402 performs the processing of transferring the Ethernet frames received by Ethernet transceiver 401 to proper transfer destinations based on the rule held by switch rule holder 403.

Switch rule holder 403 is a storage device that holds the switch rule used by switch processor 402 for transferring the Ethernet frames.

Statistical information generator 406 generates statistical information from the Ethernet frames received by Ethernet transceiver 401. Statistical information generator 406 generates the statistical information in any of two operation modes of the normal mode and the extended mode. In the normal mode, the flow information is generated in accordance with IPFIX. Unlike in the normal mode, in the extended mode, the flow information is generated in accordance with the contents of the Ethernet payloads.

Statistical information generator 406 receives mode switch instruction commands, that is, switch instructions from Ethernet transceiver 401 and its operation mode.

Note that the statistical information generated by statistical information generator 406 is, for the same reasons described in statistical information generator 206 of CAN gateway 200, assigned with the probe ID number indicating which statistical information generator has generated the information. An example will be described in this embodiment where the probe ID number of central gateway 400, that is, statistical information generator 406 is "789".

Statistical information collector 408 collects the statistical information. Specifically, statistical information collector 408 collects the statistical information on central gateway 400 obtained from statistical information generator 406. Statistical information collector 408 also collects the statistical information generated by autonomous driving DCU 100 and CAN gateway 200 and received via Ethernet transceiver 401. In addition, statistical information collector 408 transmits periodically collected statistical information to external server 2. Server 2 has a security information and event management (SIEM) function and detects an anomaly using the received statistical information.

With respect to the statistical information collected by statistical information collector 408, anomaly detection processor 404 determines whether there is an anomaly in the traffic on the on-board network based on the rule held by anomaly detection rule holder 405. Detecting an anomaly, anomaly detection processor 404 stores the details of the anomaly as a log and informs server 2 of the details of the anomaly detection via telematic control unit 410 (not shown).

Anomaly detection rule holder 405 is a storage device that holds the rule (also referred to as an "anomaly detection rule") used by anomaly detection processor 404 for anomaly detection processing.

Switch instructor 407 switches the operation mode of statistical information generator 406, and switches the operation modes of the other statistical information generators, that are, statistical information generator 106 of autonomous driving DCU 100 and statistical information generator 206 of CAN gateway 200. In order to switch the operation modes of statistical information generators 106 and 206, switch instructor 407 transmits the switch instructions indicating the operation modes via Ethernet 10.

Switch instructor 407 determines whether switch conditions are satisfied which will be described later. Determining a satisfaction of the switch conditions, switch instructor 407 switches the operation modes of statistical information generator 406 and other generators from the normal mode to the extended mode, and transmits switch instructions to autonomous driving DCU 100 (i.e., statistical information generator 106) and CAN gateway 200 (i.e., statistical information generator 206).

FIG. 8 shows switch conditions 800 that are examples of conditions of switching operation modes according to this embodiment. Specifically, FIG. 8 shows switch conditions where switch instructor 407 switches the operation mode of autonomous driving DCU 100 from the normal mode to the extended mode. An example will be described here whether five conditions are registered.

Under Condition 1, an anomaly has been detected in the communications by telematic control unit (TCU) 410. For example, this requirement is satisfied when an anomaly has been detected when telematic control unit 410 has received a communication frame from an external device or when telematic control unit 410 transmits a communication frame to an external device. Telematic control unit 410 connected to external network 30 is an entrance to the communications from external devices to vehicle 1 and highly likely to be attacked. Assume that vehicle 1 is infected by malware and establishes communications with a command and control (C2) server. In this case as well, there is a risk that an anomaly occurs in the communications by telematic control unit 410 and develops into an attack such as fraud control of vehicle 1. If an anomaly has been detected, it is thus expected to switch the operation mode from the normal mode to the extended mode, analyze the overall traffic on the on-board network in more detail, and grasp the details of the attack earlier.

Under Condition 2, an anomaly has been detected in the communications from diagnostic port 420. Diagnostic port 420 is also an entrance to the communications from external devices to vehicle 1 and highly likely to be attacked. If an anomaly has been detected in the communications by diagnostic port 420, the following is thus expected before the anomaly develops into an attack, such as fraud control of vehicle 1, via diagnostic port 420. The operation mode for generating the statistical information is to be switched from the normal mode to the extended mode. The overall traffic on the on-board network is to be analyzed in more detail. The details of the attack are to be grasped earlier.

Under Condition 3, an anomaly has been detected in the communications from IVI 310. IVI 310 is connected to an external device via a smartphone or a universal serial bus (USB). There is a risk that the anomaly develops into an attack, such as fraud control of vehicle 1, via the connection. If an anomaly has been detected in the communications by IVI 310, it is thus expected to switch the operation mode from the normal mode to the extended mode, analyze the overall traffic on the on-board network in more detail, and grasp the details of the attack earlier.

Under Condition 4, communications with an IP address not present inside the vehicle, that is, an IP address not to be observed usually have been detected. In this case, there is a risk that an unauthorized external server such as a C2 server is connected or that an unauthorized external device is connected to the inside of the vehicle. To address the risk, if an anomaly has been detected, it is expected to switch the operation mode from the normal mode to the extended mode, analyze the overall traffic on the on-board network in more detail, and grasp the details of the attack earlier.

Under Condition 5, communications with a MAC address not present inside the vehicle, that is, a MAC address not to be observed usually have been detected. Like under Condition 4, there is a risk that an unauthorized external device is connected to the inside of the vehicle. To address the risk, if such an anomaly has been detected, it is also expected to switch the operation mode from the normal mode to the extended mode, analyze the overall traffic on the on-board network in more detail, and grasp the details of the attack earlier.

Figure 9:
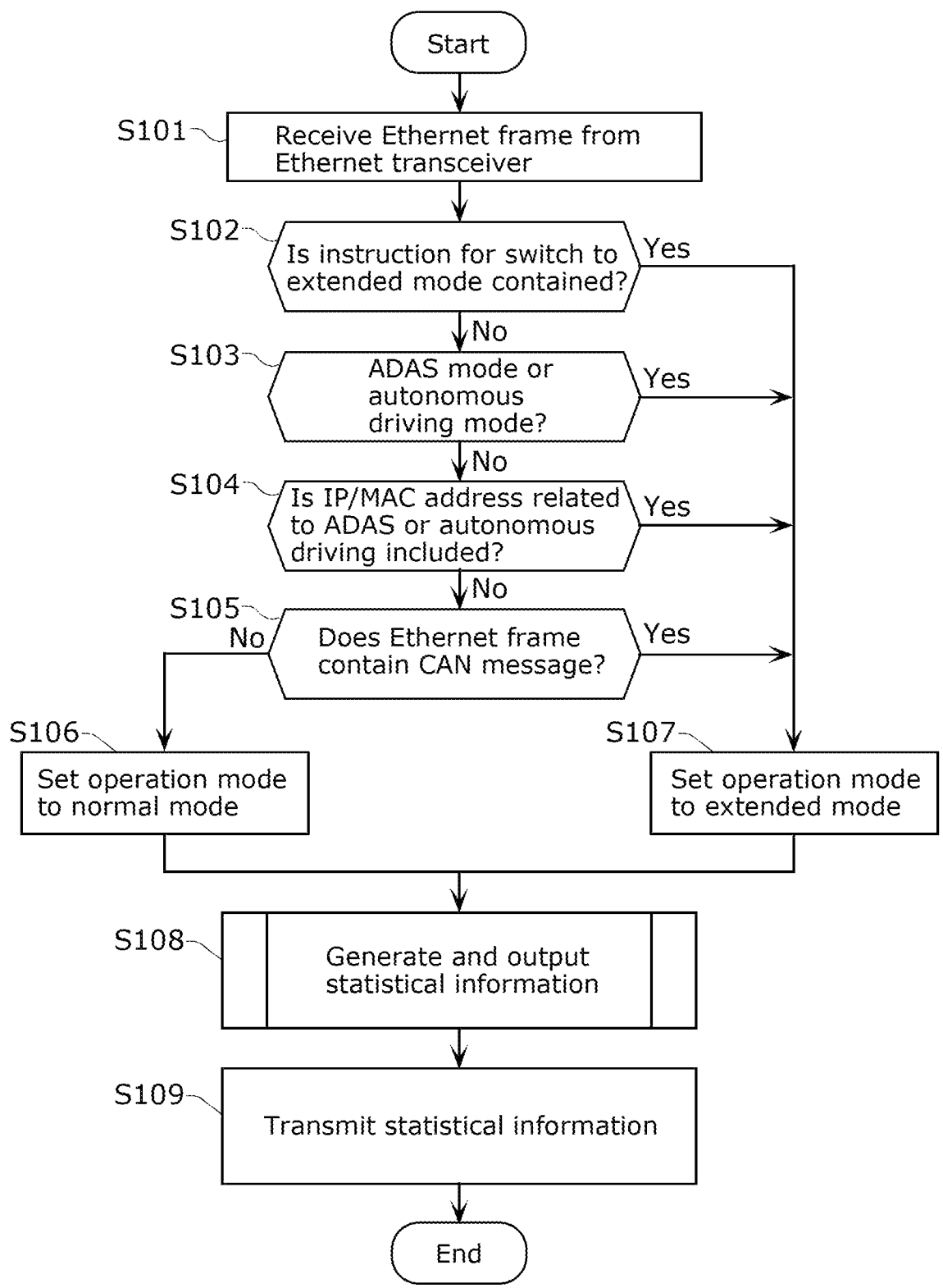
FIG. 9 is a flowchart showing the processing of generating and transmitting statistical information according to the embodiment.

FIG. 9 is a flowchart showing the processing of generating and transmitting the statistical information. Specifically, the processing shown in FIG. 9 is executed by statistical information generators 106, 206, and 406. While the processing executed by statistical information generator 106 will be described here, the same applies to statistical information generator 206 or 406.

In step S101, statistical information generator 106 receives an Ethernet frame from Ethernet transceiver 101.

In step S102, statistical information generator 106 determines whether the Ethernet frame received in step S101 contain an instruction for switch to the extended mode. As the result of the determination, if the frame is determined to contain an instruction for switch to the extended mode (Yes in step S102), the processing shifts to step S107. If not (No in step S102), the processing shifts to step S103.

In step S103, statistical information generator 106 determines whether the current status of vehicle 1 is an Advanced driver-assistance system (ADAS) mode or an autonomous driving mode. As the result of the determination, if the current status is determined to be the ADAS mode or the autonomous driving mode (Yes in step S103), the processing shifts to step S107. If not (No in step S103), the processing shifts to step S104.

In step S104, statistical information generator 106 determines whether the destination IP address, source IP address, destination MAC address, or source MAC address of the Ethernet frame received in step S101 is the address of a control unit (e.g., an ECU, a DCU, or a GW) related to the ADAS or autonomous driving. As the result of the determination, if any of the addresses is determined to be the address of a control unit related to the ADAS or the autonomous driving (Yes in step S104), the processing shifts to step S107. If not (No in step S104), the processing shifts to step S105.

In step S105, statistical information generator 106 determines whether the payload of the Ethernet frame received in step S101 includes a CAN frame. As the result of the determination, if the payload is determined to include a CAN frame (Yes in step S105), the processing shifts to step S107. If not (No in step S105), the processing shifts to step S106.

In step S106, statistical information generator 106 sets the operation mode to the normal mode.

In step S107, statistical information generator 106 sets the operation mode to the extended mode.

In step S108, statistical information generator 106 generates the statistical information in the normal mode or the extended mode in accordance with the operation mode and outputs the generated statistical information.

In step S109, statistical information generator 106 transmits the statistical information generated in step S108 to a control unit including statistical information collector 408. In this embodiment, central gateway 400 is the control unit including statistical information collector 408. The statistical information generated by statistical information generator 106, 206, or 406 is thus collected by statistical information collector 408 of central gateway 400.

Assume that statistical information generator 106 determines that a transceiver has received one Ethernet frame containing a predetermined IP address as the source IP address or the destination IP address. In this case, statistical information generator 106 may generate the statistical information in the one Ethernet frame in the extended mode. In other words, statistical information generator 106 may generate the statistical information from the one Ethernet frame in the extended mode and generate the statistical information from the subsequent Ethernet frames in the normal mode.

Assume that statistical information generator 106 determines that a transceiver has received one Ethernet frame containing related to a mobility control instruction. In this case, statistical information generator 106 may generate the statistical information from the one Ethernet frame in the extended mode. In other words, statistical information generator 106 may generate the statistical information from the one Ethernet frame in the extended mode and generate the statistical information from the subsequent Ethernet frames in the normal mode.

Figure 10:
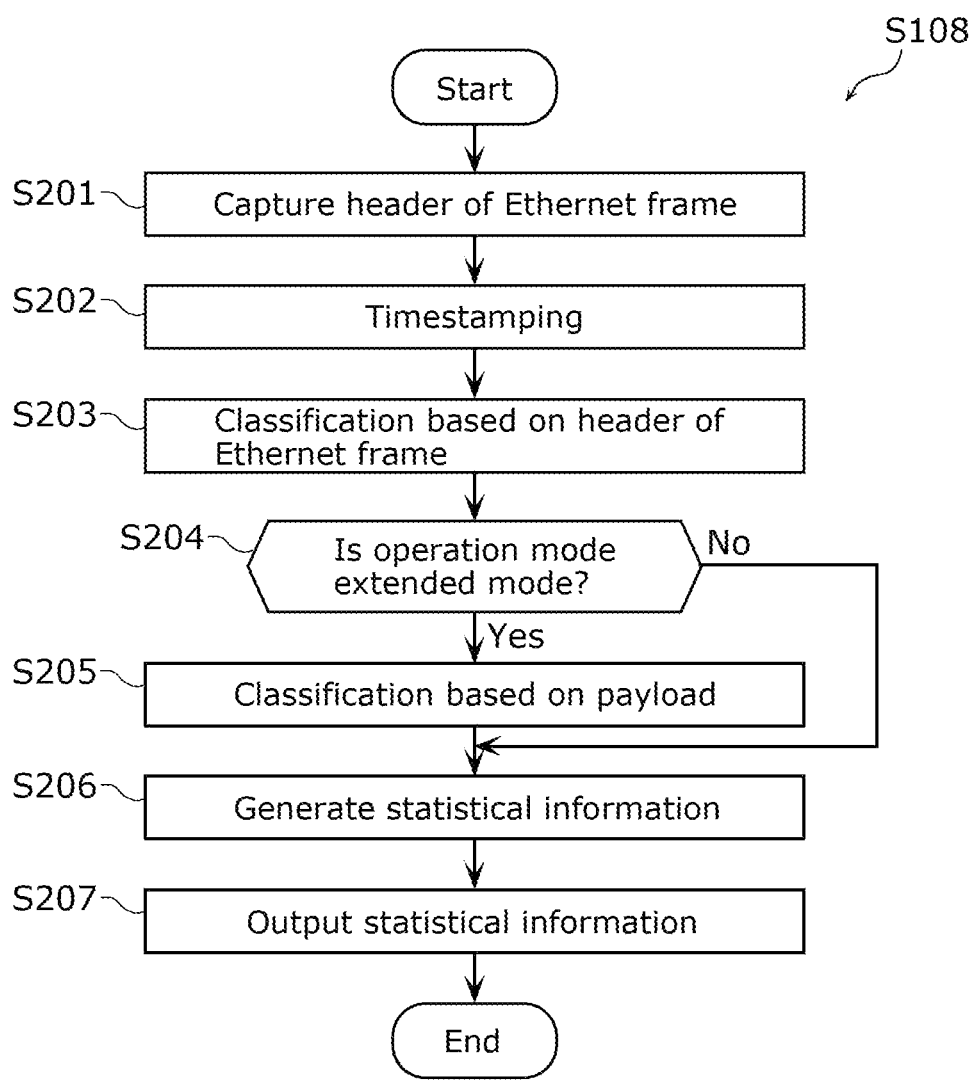
FIG. 10 is a flowchart showing, in detail, processing of generating the statistical information according to the embodiment.

FIG. 10 is a flowchart showing the processing (in step S108) of generating and transmitting the statistical information in FIG. 9 in detail.

In step S201, statistical information generator 106 captures the headers of Ethernet frames.

In step S202, statistical information generator 106 performs timestamping to the Ethernet frames, that is, associates the Ethernet frames with the information on the times of receipt.

In step S203, statistical information generator 106 classifies the Ethernet frames into groups based on the information stored in the headers of the Ethernet frames. The information includes the source IP addresses, the destination IP addresses, the source port addresses, the destination port addresses, and the protocols. Statistical information generator 106 classifies, into the same groups, the Ethernet frames with the same attributes.

In step S204, statistical information generator 106 determines whether the current operation mode is the extended mode. As the result of the determination, if the current operation mode is determined to be the extended mode (Yes in step S204), the processing shifts to step S205. If not (No in step S204), the processing shifts to step S206.

In step S205, statistical information generator 106 reclassifies the Ethernet frames classified into the same group in step S203 based on the payloads of the Ethernet frames.

In step S206, statistical information generator 106 generates the statistical information for each of groups classified in step S203 and reclassified in step S205, if the classifications in steps S203 and S205 have been executed.

In step S207, statistical information generator 106 outputs the statistical information generated in step S206.

Note that the generation and output of the statistical information in steps S206 and S207 may be performed not upon receipt of each Ethernet frame but may be performed at each predetermined time. In this case, the generation and output of the statistical information in steps S206 and S207 may be performed without receiving any Ethernet frame (in step S101).

Figure 11:
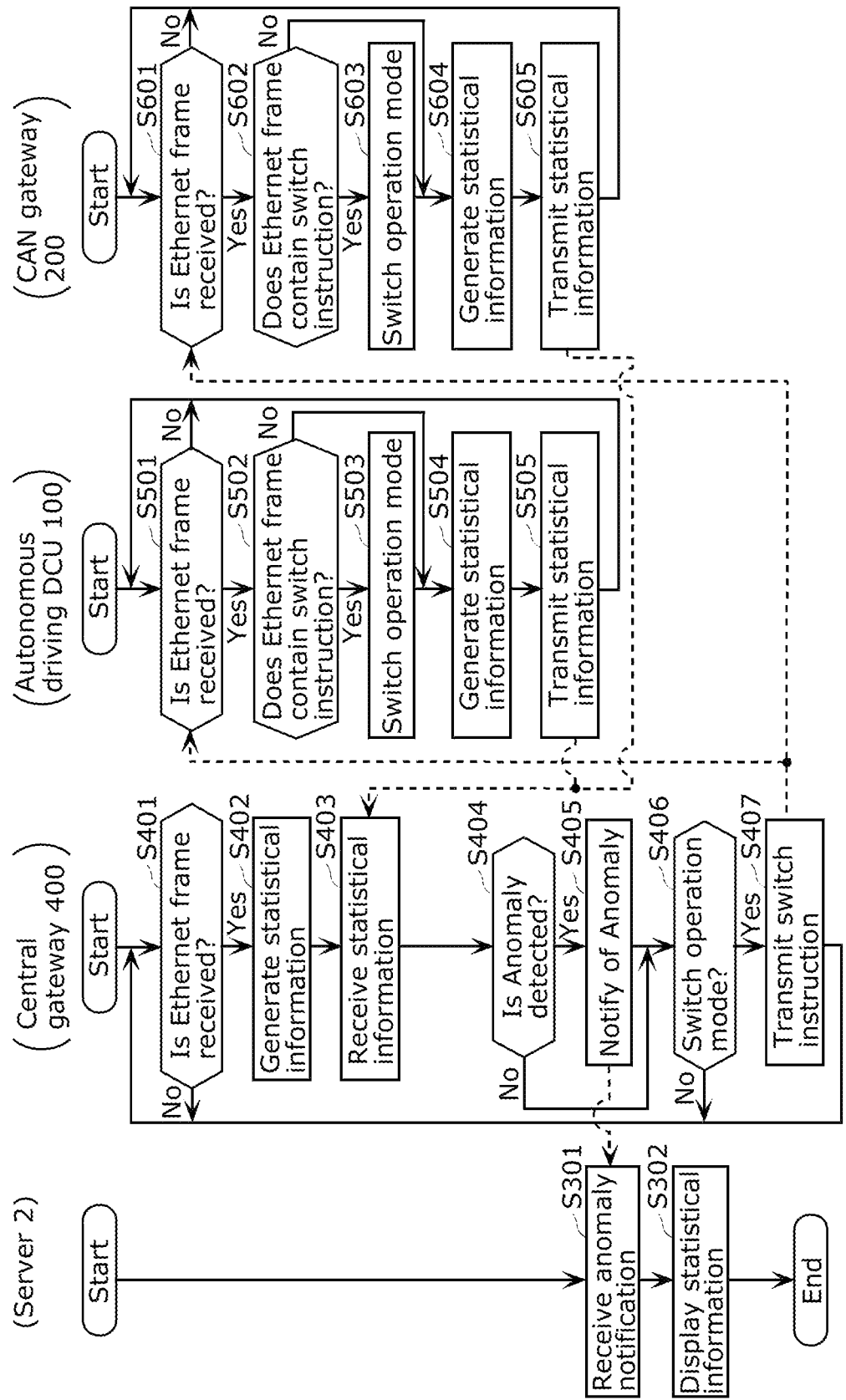
FIG. 11 is a flowchart showing the processing of devices, within a vehicle, related to anomaly detection utilizing the statistical Information according to the embodiment.

FIG. 11 is a flowchart showing the processing of the devices within vehicle 1 related to anomaly detection utilizing the statistical information according to this embodiment. FIG. 11 shows the processing of the devices where an anomaly has been detected when collecting the statistical information in the normal mode.

The processing of central gateway 400 will be described below.

In step S401, Ethernet transceiver 401 determines whether an Ethernet frame has been received. If receipt of an Ethernet frame is determined (Yes in step S401), the processing shifts to step S402. If not (No in step S401), step S401 is executed again. That is, Ethernet transceiver 401 stands by in step S401 until receipt of an Ethernet frame. Step S401 corresponds to step S101 in FIG. 9.

In step S402, statistical information collector 408 generates the statistical information. Step S402 corresponds to steps S102 to S108 in FIG. 9. In order to generate the statistical information in the extended mode, that is, at a satisfaction of any of the conditions in step S102 to S105 in FIG. 9, statistical information collector 408 changes its operation mode to the extended mode.

In step S403, statistical information collector 408 collects the received statistical information. The statistical information received by statistical information collector 408 includes the following statistical information. One of the statistical information is transmitted by statistical information generator 106 of autonomous driving DCU 100 in step S505 which will be described later. The other statistical information is transmitted by statistical information generator 206 of CAN gateway 200 in step S605 which will be described later.

In step S404, anomaly detection processor 404 detects an anomaly in the statistical information collected by statistical information collector 408 in step S403 in accordance with the rule held in anomaly detection rule holder 405. If anomaly detection processor 404 has detected an anomaly (Yes in step S404), the processing shifts to step S405. If not (No in step S404), the processing shifts to step S406.

In step S405, anomaly detection processor 404 notifies server 2 of the details of the anomaly detected in step S404.

In step S406, switch instructor 407 determines whether to switch the operation mode of each of autonomous driving DCU 100 and CAN gateway 200 from the normal mode to the extended mode. Specifically, switch instructor 407 determines whether the statistical information obtained from autonomous driving DCU 100 and CAN gateway 200 satisfies any of the conditions in steps S102 to S105 in FIG. 9. Determining that the statistical information satisfies any of the conditions in steps S102 to S105 in FIG. 9, switch instructor 407 determines to switch the operation mode from the normal mode to the extended mode. Note that switch instructor 407 may determine, in addition to the determination, whether to switch the operation mode of central gateway 400 from the normal mode to the extended mode. Specifically, switch instructor 407 determines whether the statistical information on central gateway 400 satisfies any of the conditions in steps S102 to S105 in FIG. 9. Determining that the statistical information satisfies any of the conditions in steps S102 to S105 in FIG. 9, switch instructor 407 determines to switch the operation mode from the normal mode to the extended mode.

In step S407, switch instructor 407 transmits a switch instruction to autonomous driving DCU 100 and CAN gateway 200. Note that switch instructor 407 transmits a switch instruction to statistical information generator 406, if switch of the operation mode of central gateway 400 from the normal mode to the extended mode is determined. After the end of step S407, the processing shifts to step S401.

Next, the processing of autonomous driving DCU 100 will be described below.

In step S501, Ethernet transceiver 101 determines whether an Ethernet frame has been received. If receipt of an Ethernet frame is determined (Yes in step S501), the processing shifts to step S502. If not (No in step S501), step S501 is executed again. That is, Ethernet transceiver 101 stands by in step S501 until receipt of an Ethernet frame.

In step S502, statistical information generator 106 determines whether the Ethernet frame received in step S501 contains a switch instruction. If a switch instruction is determined to be contained (Yes in step S502), the processing shifts to step S503. If not (No in step S502), the processing shifts to step S504.

In step S503, statistical information generator 106 changes its operation mode from the normal mode to the extended mode.

In step S504, statistical information generator 106 generates the statistical information in the normal mode or the extended mode in accordance with the operation mode.

In step S505, statistical information generator 106 transmits the statistical information generated in step S504 to central gateway 400 including statistical information collector 408. After the end of step S505, the processing shifts to step S501.

Next, the processing of CAN gateway 200 will be described below.

In step S601, Ethernet transceiver 201 determines whether an Ethernet frame has been received. If receipt of an Ethernet frame is determined (Yes in step S601), the processing shifts to step S602. If not (No in step S601), step S601 is executed again. That is, Ethernet transceiver 201 stands by in step S601 until receipt of an Ethernet frame.

In step S602, statistical information generator 206 determines whether the Ethernet frame received in step S601 contains a switch instruction. If a switch instruction is determined to be contained (Yes in step S602), the processing shifts to step S603. If not (No in step S602), the processing shifts to step S604.

In step S603, statistical information generator 206 changes its operation mode from the normal mode to the extended mode.

In step S604, statistical information generator 206 generates the statistical information in the normal mode or the extended mode in accordance with the operation mode.

In step S605, statistical information generator 206 transmits the statistical information generated in step S604 to central gateway 400 including statistical information collector 408. After the end of step S605, the processing shifts to step S601.

Next, the processing of server 2 will be described below.

In step S301, server 2 receives an anomaly notification from central gateway 400. The anomaly notification received by server 2 includes the anomaly notification transmitted by central gateway 400 in step S406.

In step S302, server 2 displays the statistical information on a display screen. The display screen may be displayed on a display device connected to server 2, or may be displayed on a display device, such as a terminal, connected to server 2 via a communication line. The displayed statistical information is assumed to be viewed and analyzed by an analyst, for example.

FIG. 12 is an illustration showing statistical information 900 that is an example of statistical information generated by statistical information generator 106 according to this embodiment, for example, in the normal mode.

Statistical information 900 shown in FIG. 12 is an example of the flow information generated from an Ethernet frame transmitted and received by Ethernet transceiver 101. In statistical information 900, one flow corresponds to one entry. Here, one flow is a group of the following plurality of Ethernet frames. The Ethernet frames have the same destination IP address, source IP address, destination port number, source port number, and protocol. The Ethernet frames are generated by statistical information generator 106 in the normal mode.

As shown in FIG. 12, statistical information 900 includes probe ID numbers, flow ID numbers, source IP addresses, destination IP addresses, source MAC addresses, destination MAC addresses, source port numbers, destination port numbers, protocols, transmission rates, and session durations.

Each probe ID number is an identifier associated with a device that has detected a flow corresponding to an entry. The flow detected by statistical information generator 106 of autonomous driving DCU 100 has probe ID No. 456. The flow detected by statistical information generator 206 of CAN gateway 200 has probe ID No. 123. The flow detected by statistical information generator 406 of central gateway 400 has probe ID No. 789.

Each flow ID number is an identifier capable of uniquely identifying the flow corresponding to the entry.

Each of the source IP addresses, the destination IP addresses, the source MAC addresses, the destination MAC addresses, the source port numbers, the destination port numbers, and the protocols correspond to the source IP address, the destination IP address, the source MAC address, the destination MAC address, the source port number, the destination port number, and the protocol corresponding to the flow corresponding to the entry.

Each transmission rate corresponds to the traffic of the flow corresponding to the entry.

Each session duration is the time during which the flow corresponding to the entry continues. Under the protocol TCP, the session duration corresponds to the duration of a TCP session. Under the protocol UDP, the duration is not managed under the protocol UDP by itself but can be observed as the period between the first to last detections of the packets belonging to the flow.

Note that the information included in the statistical information is not limited to the items described above. For example, the following information may be added to the statistical information. The information identifies whether the statistical information is generated from an Ethernet frame transmitted by Ethernet transceiver 101 or generated from an Ethernet frame received by Ethernet transceiver 101.

FIG. 13 shows an example of classification of flows where the data field of Ethernet frames according to the embodiment stores a CAN message. Specifically, FIG. 13 shows the processing of generating the statistical information for each CAN ID number by statistical information generator 106 in the extended mode where the data field of the Ethernet frame stores a CAN message.

FIG. 13 shows a plurality of Ethernet frames. The Ethernet frames may be referred to as frame #1, #2, #11, #12, #13, #14, and #21 from above.

The Ethernet frames shown in FIG. 13 have the same source IP address, destination IP address, source MAC address, destination MAC address, source port number, and destination port number but different CAN ID numbers, namely, No. 100 or 200 in the payloads.

In this case, statistical information generator 106 classifies, among the Ethernet frames shown in FIG. 13, Ethernet frames #1, #2, #11, #13, and #21 with CAN ID No. 100 into one group. This group will be also referred to as a "flow with flow ID No. 10".

On the other hand, statistical information generator 106 classifies, among the Ethernet frames shown in FIG. 13, Ethernet frames #12 and #14 with CAN ID No. 200 into one group. This group will be also referred to as a "flow with flow ID No. 20".

Statistical information generator 106 then generates the statistical information for each flow.

FIG. 14 is an illustration showing statistical information 1000 that is an example of the statistical information generated by statistical information generator 106, for example, according to this embodiment in the extended mode and collected by statistical information collector 408.

Statistical information 1000 shown in FIG. 14 is example flow information generated from an Ethernet frame transmitted and received by Ethernet transceiver 101. In statistical information 1000, one flow corresponding to one entry. Here, one flow is a group of the following plurality of Ethernet frames. The Ethernet frames have the same CAN ID number as well as the same destination IP address, source IP address, destination port number, source port number, and protocol. The Ethernet frames are generated by statistical information generator 106 in the extended mode.

As shown in FIG. 14, statistical information 1000 includes probe ID numbers, flow ID numbers, source IP addresses, destination IP addresses, source MAC addresses, destination MAC addresses, source port numbers, destination port numbers, protocols, CAN ID numbers, transmission rates, and session durations.

Statistical information 1000 differs from statistical information 900 (see FIG. 12) generated in the normal mode in including the CAN ID numbers.

Each CAN ID number is the CAN ID number corresponding to an entry. The CAN ID number is an example of identification information related to mobility control.

This configuration allows statistical information generator 106 to distinguish and generate the statistical information for each CAN ID number included in the Ethernet frame data area as described above.

FIG. 15 is an illustration showing rule table 1100 that is an example of a rule table including an anomaly detection rule according to this embodiment. FIG. 15 shows the anomaly detection rule held by anomaly detection rule holder 405 of central gateway 400.

FIG. 15 is a whitelist of conditions of Ethernet flows to be permitted. Note that a blacklist of conditions of Ethernet flows to be denied (i.e., prohibited) may be used in place of the whitelist.

For example, the rule with rule ID No. 001 defines the following as conditions. The flow has probe ID No. 123 or 789, source IP address 192.168.0.10, destination IP address 192.168.0.20, source MAC address AA:BB:CC:DD:EE:FF, destination MAC address AB:AB:AB:CD:CD:CD, source port number 10, destination port number 20, and CAN ID No. 100. The transmission rate ranges from 0.8 Mbps to 1.2 Mbps. The session duration is one second or more.

For example, the rule with rule ID No. 005 defines the following as conditions. The flow has any of all probe ID numbers (i.e., any ID number), and source IP address 192.168.0.10. The upper limit of the number of simultaneously connected sessions is two.

Observing statistical information out of the conditions defined by each rule, anomaly detection processor 404 determines an occurrence of an anomaly. In the use of the blacklist, anomaly detection processor 404 determines an occurrence an anomaly, when observing statistical information satisfying the conditions defined by each rule.

FIG. 16 is an illustration showing a first example of a monitoring screen of server 2 according to the embodiment using the statistical information.

FIG. 16 shows an example of a monitoring screen used for remote monitoring of vehicle 1 using the statistical information collected by statistical information collector 408, transmitted to external server 2, and provided by server 2.

FIG. 16 shows an example of a monitoring screen where the display of the statistical information with probe ID No. 123 and probe ID No. 456 is ON, and the display of the statistical information with probe ID No. 789 is OFF.

Server 2 displays, on this screen, what kind of CAN message is transmitted and received in the Ethernet communications between autonomous driving DCU 100 and CAN gateway 200. This screen allows the user (e.g., an analyst) viewing this screen to observe what kind of CAN message is transmitted and received in the Ethernet communications between autonomous driving DCU 100 and CAN gateway 200.

FIG. 16 shows flow F1 related to an Ethernet frame including a CAN frame with CAN ID No. 100 in the payload. The Ethernet frame is transmitted from autonomous driving DCU 100 (with IP address 192.168.0.10 and source port No. 10) to CAN gateway 200 (with IP address 192.168.0.20 and destination port No. 20) at a transmission rate of 1 Mbps in the shape of an arrow. The shape is not limited to the arrow. Note that the degree of the transmission rate may be expressed by the thickness of the arrow. The expression using the same shape as flow F1 applies to flows F2, F4, F5, and F6 which will be described later.

The figure also shows flow F2 related to an Ethernet frame including a CAN frame with CAN ID No. 200 in the payload and transmitted from autonomous driving DCU 100 to CAN gateway 200 at a transmission rate of 0.1 Mbps.

Under the anomaly detection rule in FIG. 15, a flow with CAN ID No. 100 is permitted, but no flow with CAN ID No. 200 is permitted from autonomous driving DCU 100 (with source port No. 10) to CAN gateway 200 (with destination port No. 20). Accordingly, flow F2 is determined as an anomaly by anomaly detection processor 404.

In order to show the result, server 2 displays mark M near flow F2, more specifically, in the point overlapping with the shape of flow F2.

Figure 17:
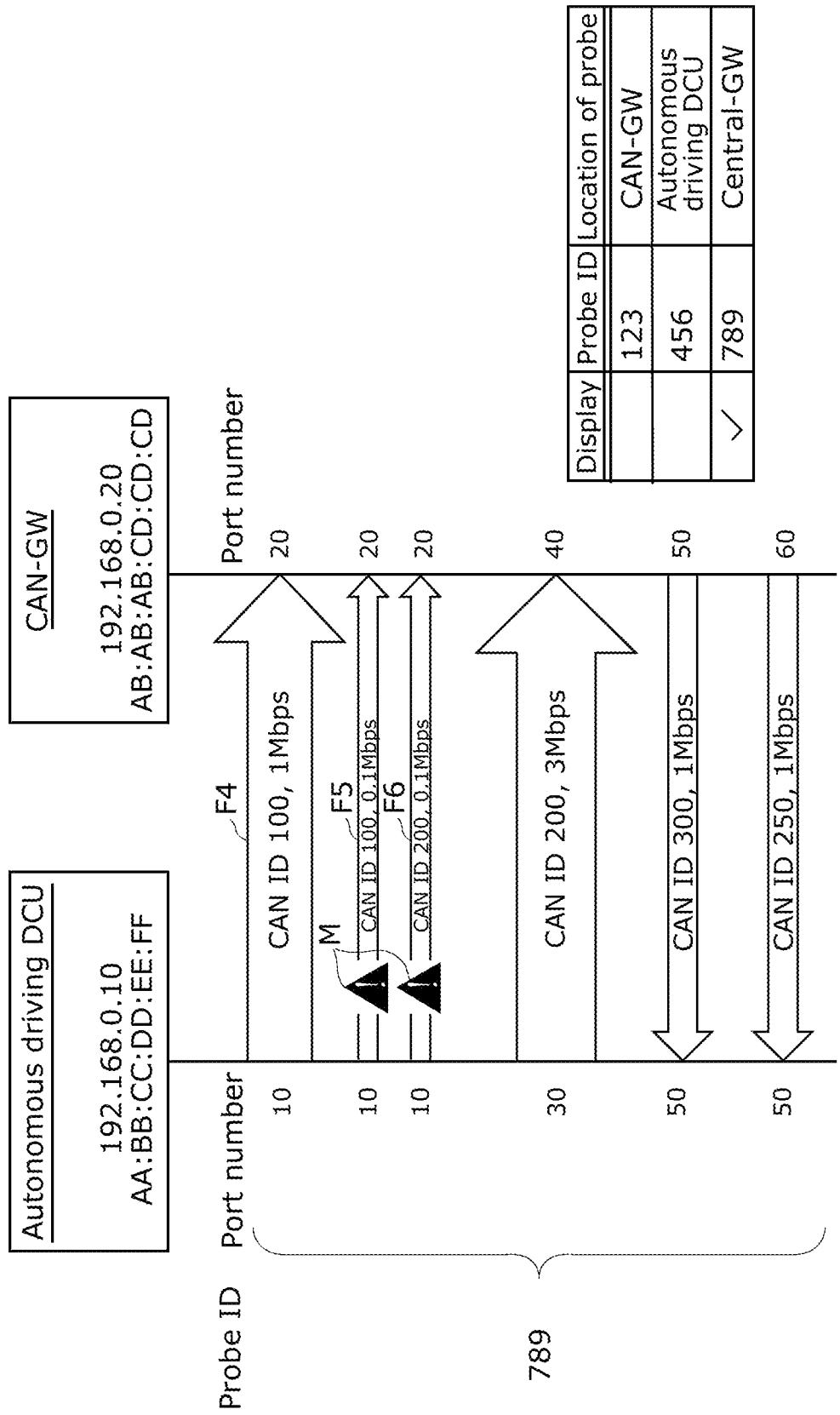
FIG. 17 is an illustration showing a second example of the monitoring screen of the server according to the embodiment using the statistical information.

FIG. 17 is an illustration showing a second example of the monitoring screen of server 2 according to the embodiment using the statistical information.

FIG. 17 shows another example of the monitoring screen used for remote monitoring of vehicle 1 using the statistical information collected by statistical information collector 408, transmitted to external server 2, and provided by server 2.

FIG. 17 shows an example of a monitoring screen where the display of the statistical information with probe ID No. 123 and probe ID No. 456 is OFF, and the display of the statistical information with probe ID No. 789 is ON.

Server 2 displays, on this screen, what kind of CAN message is transmitted and received in the Ethernet communications between autonomous driving DCU 100 and CAN gateway 200. This screen allows the user (e.g., an analyst) viewing this screen to observe what kind of CAN message is transmitted and received in the Ethernet communications between autonomous driving DCU 100 and CAN gateway 200.

FIG. 17 shows flow F4 related to an Ethernet frame including a CAN frame with CAN ID No. 100 in the payload. The Ethernet frame is transmitted from autonomous driving DCU 100 (with IP address 192.168.0.10 and source port No. 10) to CAN gateway 200 (with IP address 192.168.0.20 and destination port No. 20) at a transmission rate of 1 Mbps.

Flow F5 can also be observed which is related to an Ethernet frame including a CAN frame with CAN ID No. 110 in the payload and transmitted from autonomous driving DCU 100 to CAN gateway 200 at a transmission rate of 0.1 Mbps.

Flow F6 can also be observed which is related to an Ethernet frame including a CAN frame with CAN ID No. 200 in the payload and transmitted from autonomous driving DCU 100 to CAN gateway 200 at a transmission rate of 0.1 Mbps.

Under the anomaly detection rule in FIG. 15, a flow with CAN ID No. 100 is permitted, but no flow with CAN ID No. 110 or 200 is permitted from autonomous driving DCU 100 (with source port No. 10) to CAN gateway 200 (with destination port No. 20). Accordingly, flows F5 and F6 are determined as anomalies by anomaly detection processor 404.

If a flow related to a non-permitted Ethernet frame is observed, vehicle 1 may be attacked. Visualization as in FIG. 16 or 17 allows early detection of the attack.

[Variation 1 of Embodiment]

In this variation, a statistical information generation device will be described which properly analyzes an anomaly in, as a mobility network, an on-board network employing scalable service-oriented middleware over IP (SOME/IP) communications.

Figure 18:
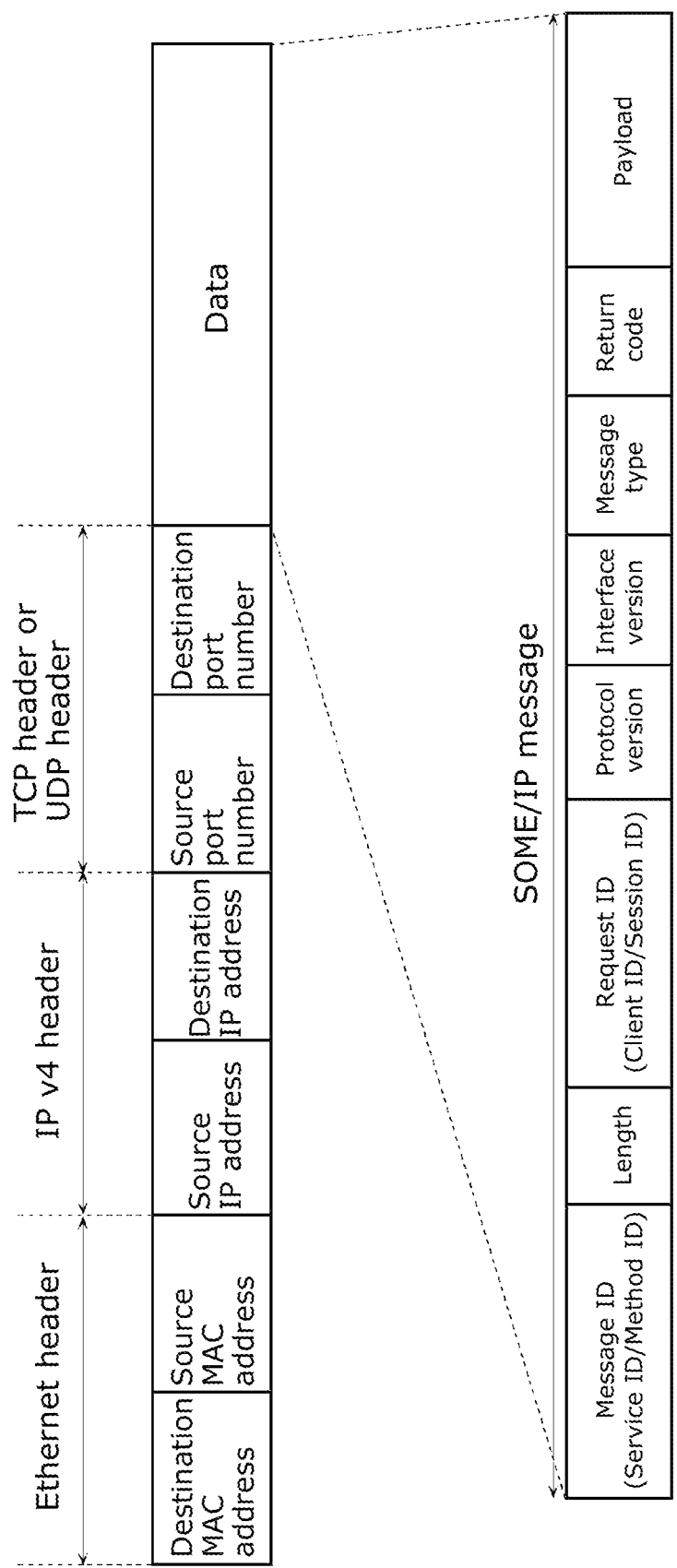
FIG. 18 is an illustration showing a frame format of an Ethernet frame containing a SOME/IP message according to Variation 1 of the embodiment.

FIG. 18 is an illustration showing a frame format of an Ethernet frame containing a SOME/IP message according to this variation.

The Ethernet frame shown in FIG. 18 stores, as data, that is, in an Ethernet payload, a message ID number (e.g., a service ID number or a method ID number), a request ID number (e.g., client ID number/a session ID number), and a protocol version used under the SOME/IP.

Figure 19:
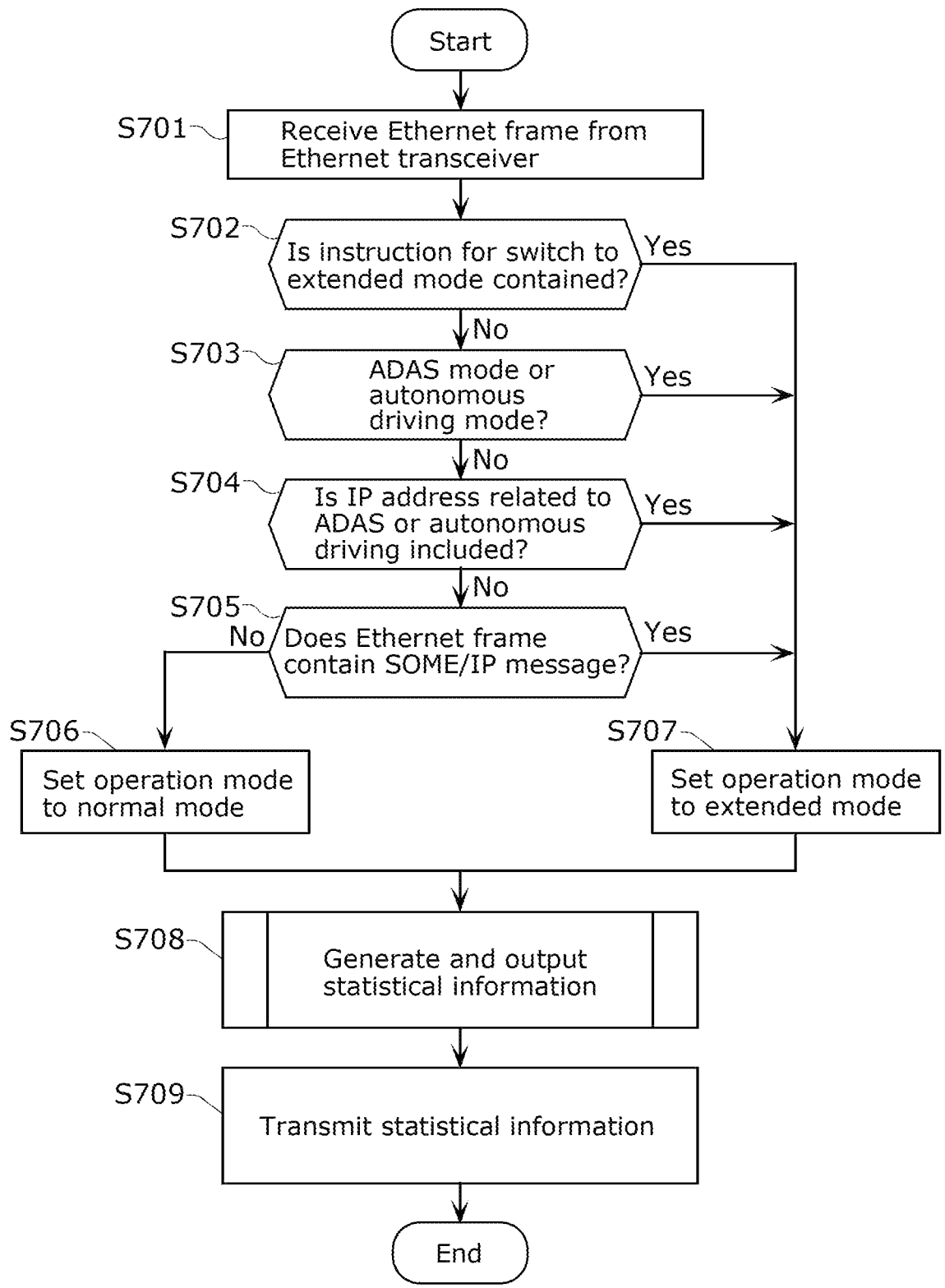
FIG. 19 is a flowchart showing the processing of generating and transmitting statistical information on SOME/IP communications according to Variation 1 of the embodiment.

FIG. 19 is a flowchart showing the processing of generating and transmitting statistical information in the SOME/IP communications according to this variation.

The flowchart shows, in FIG. 19, almost the same flow as in the case of the Ethernet payload storing a CAN frame described above with reference to FIG. 9. The flow shown in FIG. 19 differs from that in FIG. 9 in steps S705 and S708. Steps S701 to S704, S706, S707, and S709 are the same as steps S101 to S104, S106, S107, and S109, respectively, shown in FIG. 9.

Specifically, in step S705, statistical information generator 106 determines whether the Ethernet frame received in step S701 contains a SOME/IP message in the payload. As the result of the determination, if a SOME/IP message is contained (Yes in step S705), the processing shifts to step S707. If not (No in step S705), the processing shifts to step S706.

In step S708, statistical information generator 106 generates the statistical information in the normal mode or the extended mode in accordance with the operation mode, and outputs the generated statistical information. At this time, statistical information generator 106 classifies the Ethernet frames based on the items included in the SOME/IP messages. Specifically, statistical information generator 106 may classify the Ethernet frames for each message ID number, for example, to generate the statistical information or divide the Ethernet frames for each request ID to generate the statistical information.

This configuration allows grasping of the flow of transmitting and receiving control instructions in SOME/IP communications and early detection of an attack aiming at SOME/IP communications.

[Variation 2 of Embodiment]

In this variation, another example configuration of the statistical information generation device will be described which properly analyzes an anomaly in a mobility network.

Figure 20:
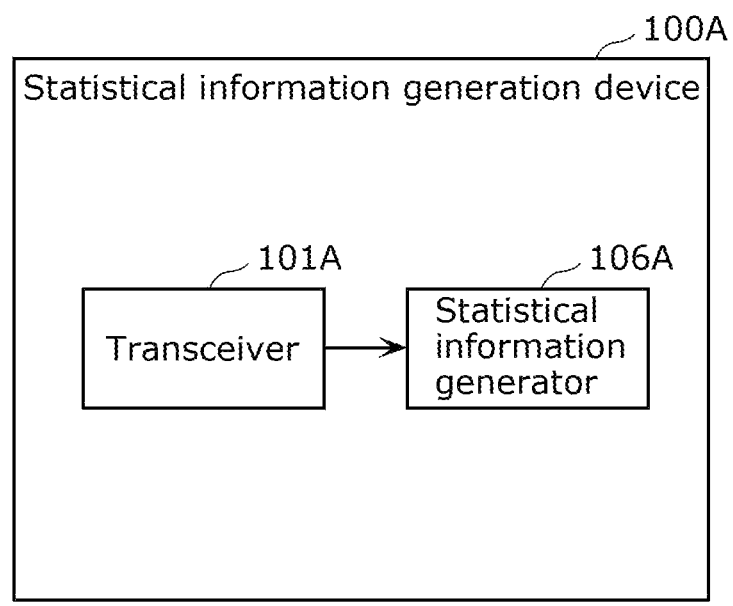
FIG. 20 is a block diagram showing a configuration of a statistical information generation device according to Variation 2 of the embodiment.

FIG. 20 is a block diagram showing a configuration of statistical information generation device 100A according to this variation.

As shown in FIG. 20, statistical information generation device 100A includes transceiver 101A and statistical information generator 106A.

Transceiver 101A transmits and receives Ethernet frames.

Statistical information generator 106A collects a plurality of Ethernet frames transmitted or received by transceiver 101A within a predetermined time period. Statistical information generator 106A classifies, out of the collected Ethernet frames, the following Ethernet frames into the same group. The Ethernet frames contains the same destination IP address, source IP address, destination port number, source port number, and protocol; and the same identification information related to mobility control in the payloads. In addition, statistical information generator 106A generates the statistical information for each group from the Ethernet frames classified into groups. Statistical information generator 106A transmits the generated statistical information through transceiver 101A.

This configuration allows proper analysis of an anomaly in the mobility network.

Figure 21:
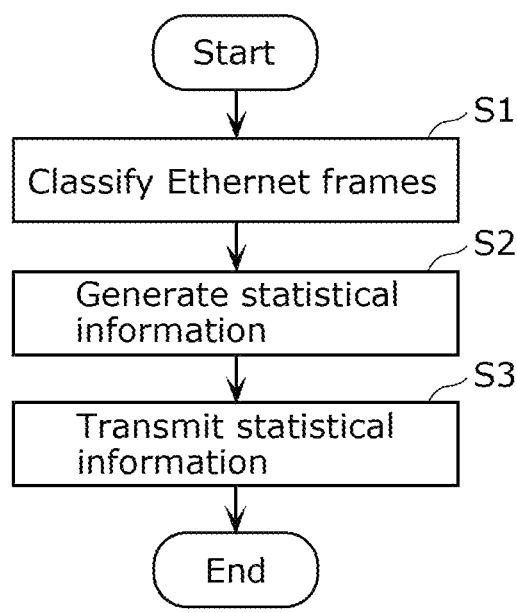
FIG. 21 is a flowchart showing the processing of a statistical information generation method according to Variation 2 of the embodiment.

FIG. 21 is a flowchart showing the processing of a statistical information generation method according to this variation.

In the statistical information generation method shown in FIG. 21, the plurality of Ethernet frames transmitted or received by transceiver 101A within the predetermined time period are collected in step S1. Out of the collected Ethernet frames, the following the Ethernet frames are classified into the same group. The Ethernet frames contain the same destination IP address, source IP address, destination port number, source port number, and protocol; and the same identification information related to mobility control in the payloads.

In step S2, the statistical information is generated for each group from the Ethernet frames classified into groups.

In step S3, the generated statistical information is transmitted by transceiver 101A.

This step allows proper analysis of an anomaly in the mobility network.

As described above, the statistical information generation device according to this embodiment generates the statistical information from the Ethernet frames as units, taking the identification information related to the mobility control in addition to the 5-tuple information (i.e., the destination IP address, the source IP address, the destination port number, the source port number, and the protocol) into consideration. This configuration allows generation of the statistical information in more detailed units than the case of generating the statistical information taking only the 5-tuple information into consideration. Using the statistical information generated in this manner allows more detailed analysis and more accurate detection of an anomaly than using the statistical information generated taking only the 5-tuple information into consideration. Accordingly, the statistical information generation device properly analyzes an anomaly in the mobility network.

The statistical information generation device generates the statistical information on the flow of the mobility network taking the 5-tuple information into consideration at a certain time. The device generates the statistical information taking the 5-tuple information and the identification information related to the mobility control into consideration at another time. In this manner, the statistical information generation device generates typical (i.e., normal) statistical information and performs the analysis based on the generated statistical information. As necessary, the device generates detailed statistical information and performs accurate analysis based on the generated statistical information. In this manner, the statistical information generation device analyzes an anomaly in the mobility network further more properly.

At a satisfaction of the predetermined condition, the statistical information generation device changes its operation mode to generate detailed statistical information and perform accurate analysis based on the generated statistical information. With the use of the condition representing the situation requiring an accurate analysis as the predetermined condition, the statistical information generation device changes its operation mode to perform accurate analysis when necessary. In this manner, the statistical information generation device analyzes an anomaly in the mobility network further more properly.

Receiving a switch instruction, the statistical information generation device changes its operation mode in accordance with the switch instruction. Since the switch instruction can be transmitted by an ECU or an external server, the statistical information generation device analyzes an anomaly in accordance with the switch instruction from the ECU or the external server, for example. In this manner, the statistical information generation device allows more proper analysis of an anomaly in the mobility network.

The statistical information generation device changes its operation mode to preform accurate analysis based on the detection of an anomaly that may occur inside the mobility network. In this manner, the statistical information generation device allows more proper analysis of an anomaly in the mobility network.

The statistical information generation device accurately analyzes the Ethernet frame containing the specific IP address as the destination or the source. For example, the device generates the statistical information, including the payload, from the Ethernet frame containing the specific IP address to be analyzed in detail. Accordingly, whether a fraud vehicle control instruction flows or whether the vehicle is attacked can be monitored. In this manner, the statistical information generation device allows more proper and flexible analysis of an anomaly in the mobility network.

The statistical information generation device accurately analyzes the Ethernet frames related to a specific mobility control instruction. For example, the device generates the statistical information, including the payload, from the Ethernet frames transmitted from or to the ECU that performs vehicle control such as travel, curve, or stop. Accordingly, whether a fraud vehicle control instruction flows can be monitored. In this manner, the statistical information generation device allows more proper and flexible analysis of an anomaly in the mobility network.

Other Embodiments

The embodiment and the variations have been described above as example techniques according to the present disclosure. However, the techniques of the present disclosure are not limited thereto, and also applicable to embodiments in which modifications, substitutions, additions and omissions are made as appropriate. For example, the following variations are included in one aspect of the present disclosure.

(1) An example has been described in the embodiment and variations where the statistical information generation device is applied as a cyber security measure in an on-board network mounted on an automobile. The applications are not limited thereto. The statistical information generation device is applicable not only to an automobile but to a mobility entity, such as a construction machine, an agricultural machine, a ship, a train, or an airplane, that is, as a cyber security measure in a mobility network and a mobility network system. The statistical information generation device is also applicable to a communication network utilized in an industrial control system as in a factory or a building, or a communication network for controlling built-in devices.

(2) In the embodiment and variations described above, the statistical information generator generates the statistical information from the received Ethernet frames. The statistical information generator may generate the statistical information from the Ethernet frames to be transmitted. The generation of the statistical information from the Ethernet frames to be transmitted facilitates the identification of a source device transmitting unauthorized Ethernet frames.

(3) An example has been described in the embodiment and variations where the Ethernet payload includes a CAN frame or a SOME/IP message. However, the Ethernet payload including a CAN flexible data-rate (CAN-FD) is also applicable. Alternatively, other protocols may be used. A local interconnect network (LIN), media oriented systems transport (MOST, registered trademark), FlexRay (registered trademark), or Ethernet (registered trademark) may be used. Networks using these protocols may be used as sub-networks. Sub-networks related to these types of protocols may be combined to form an on-board network. The Ethernet (registered trademark) protocol may be handled in a broader sense covering derivative protocols such as Ethernet (registered trademark) Audio Video Bridging (AVB) under IEEE 802.1, Ethernet (registered trademark) time sensitive networking (TSN) under IEEE 802.1, Ethernet (registered trademark)/industrial protocol (Ethernet/IP), or Ethernet (registered trademark) for Control Automation Technology (EtherCAT, registered trademark). Note that the network buses on the on-board network may be wired communication paths including wires, or optical fibers, for example.

(4) In the embodiment and variations described above, the instructions for switching the mode for generating the statistical information are transmitted by the ECU that has detected an anomaly in the in-vehicle network. The instructions may be however transmitted from external server 2. The transmission from external server 2 allows switching of the mode for generating the statistical information from a remote location. That is, detailed flow monitoring including the payloads of the Ethernet frames is possible from a remote location at any time.

(5) In the embodiment and variations described above, the statistical information including the payloads are generated in the extended mode from the Ethernet frames including ADAS or autonomous driving control commands. However, the statistical information including the payloads may be generated in the extended mode from packets for the other controls.

(6) In the embodiment described above, the anomaly detection rule is defined in FIG. 15 as a whitelist (i.e., the conditions to be satisfied by normal flows are defined). Instead, the rule may be defined as a blacklist (i.e., the conditions to be satisfied by anomalous flows may be defined). An anomaly may be detected by a whitelist and a blacklist in combination.

(7) In the embodiment and variations described above, the central gateway functions to collect the statistical information but the other devices may have the function. A plurality of devices inside the vehicle may function to collect the statistical information. For example, if there are domains divided logically in a VLAN, for example, each domain may function to collect the statistical information.

(8) In the embodiment and variations described above, FIG. 13 shows one CAN frame stored in the payload of each Ethernet frame. The present disclosure is also applicable to the case of storing a plurality of CAN frames as shown in FIG. 4. If a plurality of CAN frames are stored, each CAN ID number may be extracted at the time of generating the statistical information and the statistical information may include a plurality of CAN ID numbers.

(9) Each of the devices such as the ECUs described above in the embodiment and variations may include, in addition to the memory, the processor, etc., a hard disk unit, a display unit, a keyboard, or a mouse, for example. The functions of each of the devices such as the ECUs described above in the embodiment and variations may be achieved as software by executing programs stored in a memory by a processor. Alternatively, the functions may be achieved by dedicated hardware (e.g., digital circuits) without using programs. The functions of the constituent elements within the devices may be divided variously.

(10) Some or all of the constituent elements of each of the devices in the embodiment and variations described above may serve as a single system large-scale integrated (LSI) circuit. The system LSI circuit is a super multifunctional LSI circuit manufactured by integrating a plurality of components on a single chip, and specifically is a computer system including a microprocessor, a ROM, and a RAM, for example. The RAM stores computer programs. The microprocessor operates in accordance with the computer programs so that the system LSI circuit fulfils its function. In addition, the constituent elements of the devices may be configured as respective chips, or some or all of the constituent elements may be included into a single chip. While the system LSI circuits are named here, the integrated circuits may be referred to ICs, LSI circuits, super LSI circuits, or ultra-LSI circuits depending on the degree of integration. The circuit integration is not limited to the LSI. The devices may be dedicated circuits or general-purpose processors. A field programmable gate array (FPGA) programmable after the manufacture of an LSI circuit or a reconfigurable processor capable of reconfiguring the connections and settings of circuit cells inside an LSI may be employed. In addition, appearing as an alternative circuit integration technology to the LSI, another technology that progresses or deprives from the semiconductor technology may be used for integration of functional blocks. Biotechnology is also applicable.

(11) Some or all of the constituent elements of each of the devices described above may serve as an IC card or a single module detachably attached to the device. The IC card or the module is a computer system including a microprocessor, a ROM, and a RAM, for example. The IC card or the module may include the super multifunctional LSI circuit described above. The microprocessor operates in accordance with computer programs so that the IC card or the module fulfils its function. This IC card or this module may have a tamper resistance.

(12) An aspect of the present disclosure may be directed to programs (e.g., computer programs) causing a computer to execute the anomaly detection method or digital signals indicating the computer programs. An aspect of the present disclosure may be directed to a computer readable storage medium, such as a flexible disk, a hard disk, a CD-ROM, an MO, a DVD, a DVD-ROM, a DVD-RAM, a Blu-ray Disk (BD, registered trademark), or a semiconductor memory, capable of recording the computer programs or t digital signals. The present disclosure may be directed to the digital signals stored in these recording media. According to an aspect of the present disclosure, the computer programs or the digital signals may be transferred via telecommunication lines, wireless or wired communication lines, networks represented by the Internet, or data broadcasts, for example. An aspect of the present disclosure may be directed to a computer system including a microprocessor and a memory. The memory may store the computer programs described above, whereas the microprocessor may operate in accordance with the computer programs. The programs or the digital signals may be stored in a storage medium and then transferred, or may be transferred via a network, so as to be executed by another independent computer system.

(13) The scope of the present disclosure includes other embodiments, such as those achieved by freely combining the constituent elements and functions described above in the embodiment and variations.

INDUSTRIAL APPLICABILITY

The present disclosure can be used for a statistical information generation device that properly analyzes an anomaly in a mobility network.

The invention claimed is:

1. A statistical information generation device that generates statistical information from Ethernet (registered trademark) frames on a mobility network, the statistical information generation device comprising:
   a transceiver that transmits and receives the Ethernet frames; and
   a statistical information generator that:
      (a) collects a plurality of Ethernet frames transmitted or received by the transceiver within a predetermined time period, and classifies, out of the plurality of Ethernet frames collected, Ethernet frames containing same destination IP address, source IP address, destination port number, source port number, protocol, and containing, in payloads, same identification information related to mobility control, into a same group;
      (b) generates the statistical information for each group from the Ethernet frames classified into groups; and
      (c) transmits, from the transceiver, the statistical information generated, wherein
   the statistical information generator generates the statistical information in an operation mode that is one of a first mode and a second mode,
   in the first mode, the statistical information generator:
      (d) collects the plurality of Ethernet frames transmitted or received by the transceiver within the predetermined time period, and classifies, out of the plurality of Ethernet frames collected, Ethernet frames containing same destination IP address, source IP address, destination port number, source port number, and protocol, into a same group;
      (e) generates the statistical information for each group from the Ethernet frames classified into groups; and
      (f) transmits, from the transceiver, the statistical information generated, and in the second mode, the statistical information generator performs (a), (b), and (c).

2. The statistical information generation device according to claim 1, wherein
   the statistical information generator:
      makes a determination on whether a predetermined condition is satisfied; and
      changes the operation mode from one of the first mode and the second mode to the other, when determining that the predetermined condition is satisfied.

3. The statistical information generation device according to claim 2, wherein
   the statistical information generator makes the determination with reception of an Ethernet frame by the transceiver regarded as the predetermined condition, the Ethernet frame containing an instruction for switching the operation mode.

4. The statistical information generation device according to claim 2, wherein
   the statistical information generator:
      makes the determination with detection of an occurrence of an anomaly in the mobility network regarded as the predetermined condition; and
      changes from the first mode to the second mode at a satisfaction of the predetermined condition.

5. The statistical information generation device according to claim 1, wherein
   the statistical information generator further generates the statistical information in the second mode from one of the Ethernet frames containing a predetermined IP address as the source IP address or the destination IP address, when determining that the transceiver has received the one of the Ethernet frames.

6. The statistical information generation device according to claim 1, wherein
   the statistical information generator further generates the statistical information in the second mode from one of the Ethernet frames related to a mobility control instruction, when determining that the transceiver has received the one of the Ethernet frames.

7. A statistical information generation method executed by a statistical information generation device that generates statistical information from Ethernet frames on a mobility network,
   the statistical information generation device including:
      a transceiver that transmits and receives the Ethernet frames,
   the statistical information generation method comprising:

(a) collecting a plurality of Ethernet frames transmitted or received by the transceiver within a predetermined time period, and classifying, out of the plurality of Ethernet frames collected, Ethernet frames containing same destination IP address, source IP address, destination port number, source port number, and protocol, and containing, in payloads, same identification information related to mobility control, into a same group;

(b) generating the statistical information for each group from the Ethernet frames classified into groups; and (c) transmitting the statistical information generated, using the transceiver wherein in the statistical information generation method, the statistical information is generated in an operation mode that is one of a first mode and a second mode, in the first mode, the statistical information generation method includes:

(d) collecting the plurality of Ethernet frames transmitted or received by the transceiver within the predetermined time period, and classifying, out of the plurality of Ethernet frames collected, Ethernet frames containing same destination IP address, source IP address, destination port number, source port number, and protocol, into a same group;

(e) generating the statistical information for each group from the Ethernet frames classified into groups; and (f) transmitting the statistical information generated, using the transceiver, and in the second mode, the statistical information generation method includes performing (a), (b), and (c).

8. A non-transitory computer-readable recording medium having a program for causing a computer to execute the statistical information generation method according to claim 7.

* * * * *